(12) United States Patent
Yamamoto

(10) Patent No.: US 9,529,527 B2
(45) Date of Patent: Dec. 27, 2016

(54) INFORMATION PROCESSING APPARATUS AND CONTROL METHOD, AND RECORDING MEDIUM

(71) Applicant: CANON KABUSHIKI KAISHA, Tokyo (JP)

(72) Inventor: Keiichi Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/312,995

(22) Filed: Jun. 24, 2014

(65) Prior Publication Data

US 2015/0002424 A1    Jan. 1, 2015

(30) Foreign Application Priority Data

Jun. 26, 2013  (JP) ................................. 2013-133530

(51) Int. Cl.
    *G06F 3/0488*    (2013.01)

(52) U.S. Cl.
    CPC ................................. *G06F 3/04883* (2013.01)

(58) Field of Classification Search
    CPC .................................................. G06F 3/04883
    See application file for complete search history.

(56) References Cited

U.S. PATENT DOCUMENTS

| 5,272,470 | A | * | 12/1993 | Zetts | G06F 3/04883 |
| | | | | | 178/19.01 |
| 5,404,458 | A | * | 4/1995 | Zetts | G06F 3/04883 |
| | | | | | 345/173 |
| 5,570,113 | A | * | 10/1996 | Zetts | G06F 3/04883 |
| | | | | | 345/156 |
| 7,180,506 | B2 | | 2/2007 | Lin | |
| 2007/0091077 | A1 | * | 4/2007 | Lii | G06F 3/044 |
| | | | | | 345/173 |
| 2007/0124503 | A1 | * | 5/2007 | Ramos | G06F 3/017 |
| | | | | | 709/248 |
| 2010/0295824 | A1 | * | 11/2010 | Noguchi | G02F 1/13338 |
| | | | | | 345/175 |
| 2011/0032198 | A1 | | 2/2011 | Miyazawa | |
| 2011/0057903 | A1 | * | 3/2011 | Yamano | G06F 3/0237 |
| | | | | | 345/174 |
| 2012/0235921 | A1 | * | 9/2012 | Laubach | G06F 3/0238 |
| | | | | | 345/172 |
| 2013/0201108 | A1 | * | 8/2013 | Hirsch | G06F 3/0488 |
| | | | | | 345/168 |

FOREIGN PATENT DOCUMENTS

| CN | 1922632 A | 2/2007 |
| CN | 102402369 A | 4/2012 |
| CN | 102520858 A | 6/2012 |
| JP | 2011-34502 A | 2/2011 |

\* cited by examiner

*Primary Examiner* — Ilana Spar
*Assistant Examiner* — Mihir Rayan
(74) *Attorney, Agent, or Firm* — Canon U.S.A., Inc. IP Division

(57) ABSTRACT

An information processing apparatus can recognize a first operation made up of a first input and a second operation made up of the first input and an input that follows after the first input. Input by an operating object is detected, starts a response corresponding to the first operation after the first input from the operating object is detected, regardless of existence of any input to follow after the first input, in a case that information relating to movement of the operating object moving in a direction parallel to an input subject face, which is the subject for the operating object to perform the first input, satisfies a predetermined condition.

20 Claims, 13 Drawing Sheets

FIG. 3A
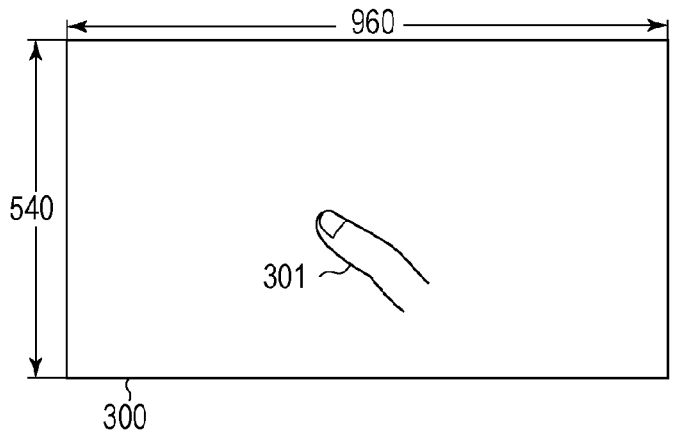
FIG. 3B
FIG. 3C
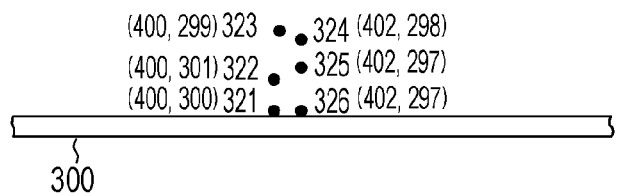
FIG. 3D
| DETECTION POINT-IN-TIME | x COORDINATE | y COORDINATE | PROXIMITY FLAG |
|---|---|---|---|
| 0 | 400 | 300 | OFF |
| 20 | 397 | 299 | ON |
| 40 | 403 | 298 | ON |
| 60 | 410 | 284 | ON |
| 80 | 425 | 278 | ON |
| 100 | 442 | 263 | ON |
FIG. 3E
| DETECTION POINT-IN-TIME | x COORDINATE | y COORDINATE | PROXIMITY FLAG |
|---|---|---|---|
| 0 | 400 | 300 | OFF |
| 20 | 400 | 301 | ON |
| 40 | 400 | 299 | ON |
| 60 | 402 | 298 | ON |
| 80 | 402 | 297 | ON |
| 100 | 402 | 297 | OFF |

FIG. 6A
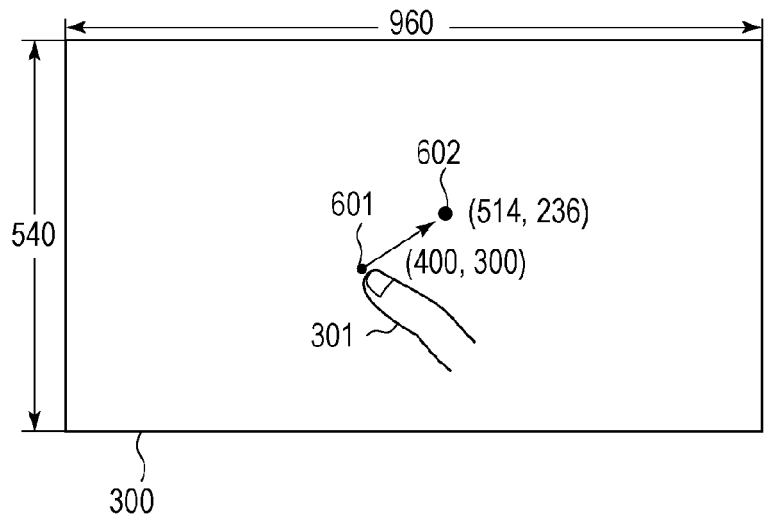
FIG. 6B
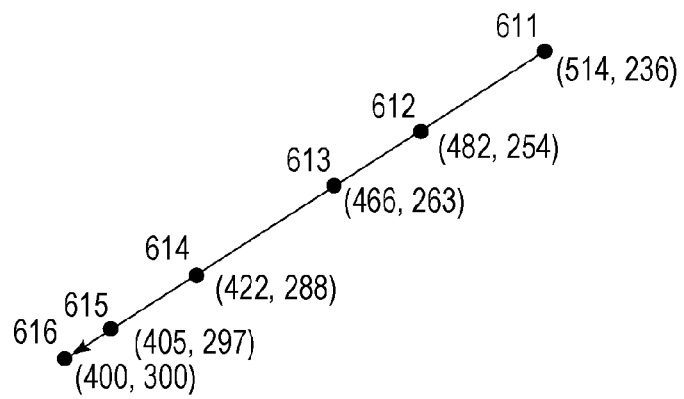
FIG. 6C
| DETECTION POINT-IN-TIME | x COORDINATE | y COORDINATE | PROXIMITY FLAG |
|---|---|---|---|
| 0 | 400 | 300 | OFF |
| 20 | 514 | 236 | OFF |
| 40 | 514 | 236 | ON |
| 60 | 482 | 254 | ON |
| 80 | 466 | 263 | ON |
| 100 | 422 | 288 | ON |
| 120 | 405 | 297 | ON |
| 140 | 400 | 300 | OFF |

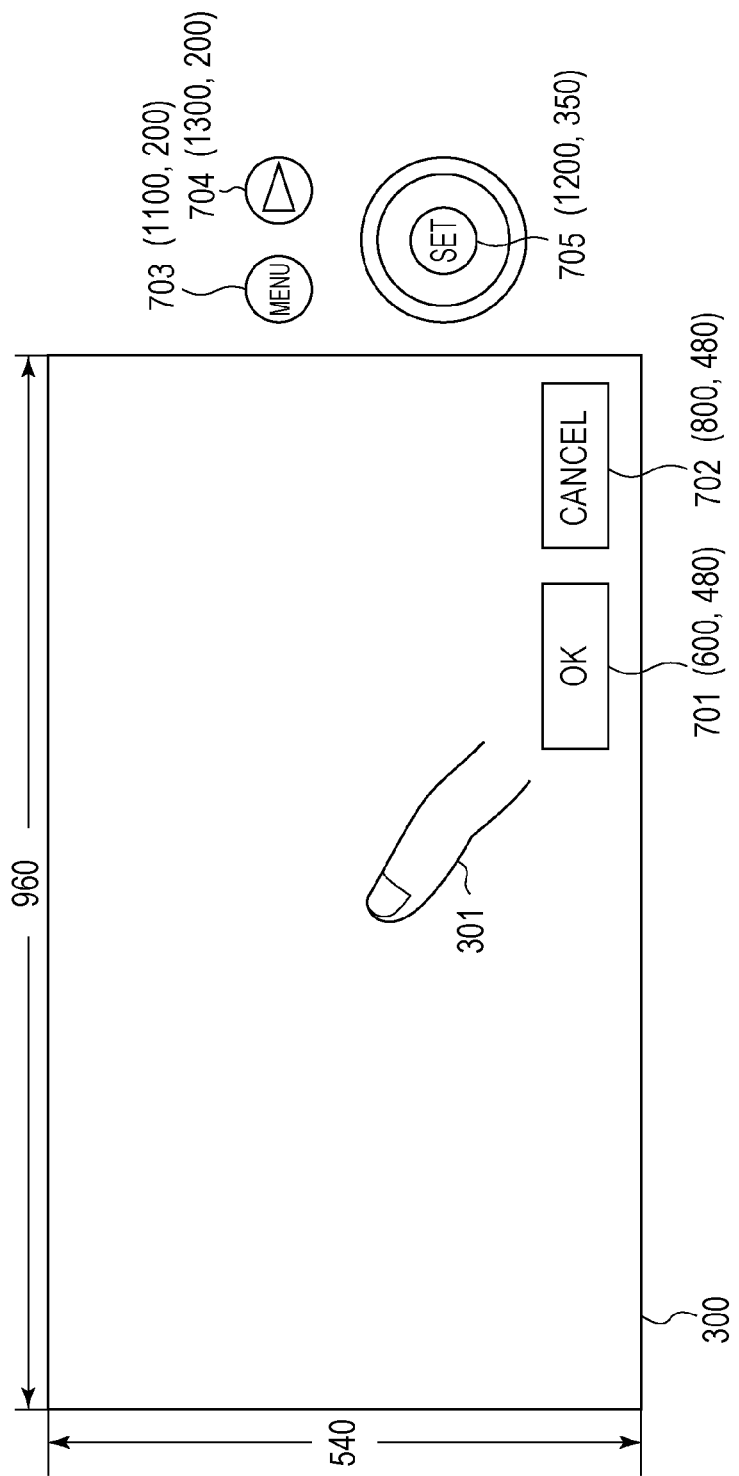

| LETTER | NUMBER OF IMAGES | TRAIL | STARTING POSITION | ENDING POSITION | NEXT IMAGE | STARTING POSITION OF NEXT IMAGE | RATIO |
|---|---|---|---|---|---|---|---|
| A | 1 | / | (100, 0) | (0, 100) | \ | (100, 0) | (−1, −1) |
|  | 2 | \ | (50, 0) | (100, 100) | − | (25, 50) | (−1.5, −0.5) |
|  | 3 | − | (25, 50) | (75, 50) | NONE | NONE | NONE |
| B | 1 | I | (0, 0) | (0, 100) | 3 | (0, 0) | (0, −1) |
|  | 2 | 3 | (0, 0) | (0, 100) | NONE | NONE | NONE |
| C | 1 | C | (100, 40) | (100, 60) | NONE | NONE | NONE |
| D | 1 | I | (0, 0) | (0, 100) | ⊃ | (0, 0) | (0, −1) |
|  | 2 | ⊃ | (0, 0) | (0, 100) | NONE | NONE | NONE |
| ⋮ | ⋮ | ⋮ | ⋮ | ⋮ | ⋮ | ⋮ | ⋮ |

| OPERATION | OTHER OPERATION WITH POSSIBILITY OF INPUT | STARTING POSITION OF OTHER OPERATION |
|---|---|---|
| ↰ | ↱ | (480, 440) |
|  | ↵ | (480, 100) |
|  | ↳ | (480, 100) |
| ↱ | ↰ | (480, 440) |
|  | ↵ | (480, 100) |
|  | ↳ | (480, 100) |
| : | : | : |

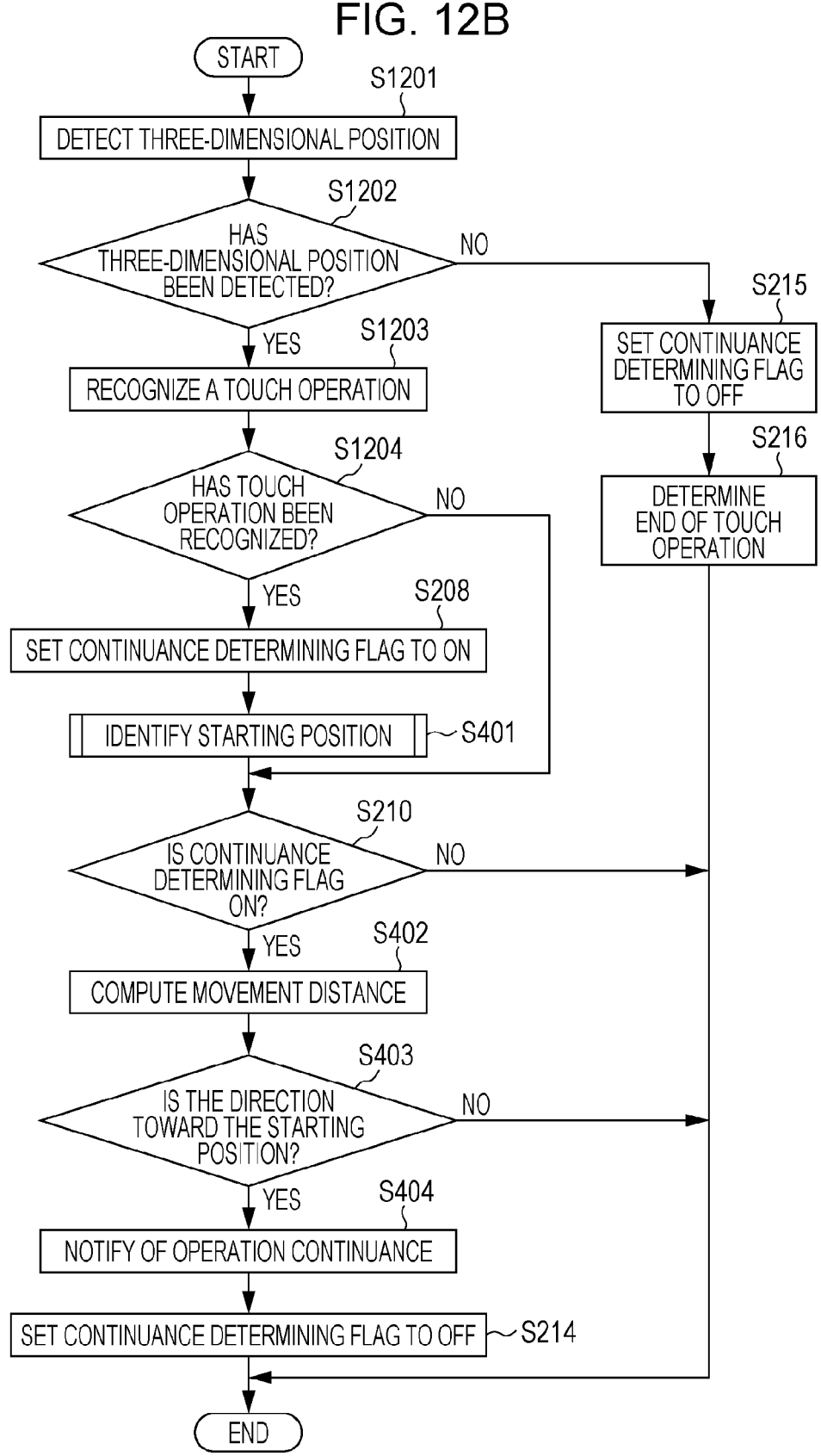

INFORMATION PROCESSING APPARATUS AND CONTROL METHOD, AND RECORDING MEDIUM

BACKGROUND OF THE INVENTION

Field of the Invention

The present disclosure generally relates to information processing and, more particularly, to an information processing apparatus and control method, and a recording medium, wherein multiple types of input operations are recognized.

Description of the Related Art

Recently, touch input devices, which recognize a touch operation based on X-Y coordinate values of a position at which an input unit such as a touch panel or the like has been touched by an operating object such as the finger of a user or a stylus or the like, and execute various types of processing according to the touch operation, have become prevalent. Among touch operations, there is a touch operation where an operation of touching and releasing the touch panel or the like with an operating object multiple times is recognized to be an instruction for an execution of one process. That is to say, there are cases in which the finger or stylus is temporarily separated from the touch panel or the like during the operation (hereinafter called release). This type of touch operation, which is made up of first input and a following input thereto, is known as a double-tap. A double-tap is recognized according to a tap (an operation of touching the touch panel and quickly releasing) being input twice consecutively within a predetermined period of time. As opposed to a double-tap, an operation that ends after just one tap is generally called a single-tap.

U.S. Pat. No. 7,180,506 B2 discloses a method of distinguishing a double-tap and single-tap, by notifying a signal to indicate the single tap after confirming that a second touch is not performed within a predetermined time from the point-in-time of the first touch to the touch panel.

Also, an operation in which a character of two strokes or more are input by handwriting is also known as a touch operation that is made up of a first input and a following input thereto.

Currently, in cases where an operation made up of a first input and a following input thereto is valid, generally a waiting time (generally, approximately 300 ms) of a predetermined time such as disclosed in U.S. Pat. No. 7,180,506 is provided, whereby determination is made as to whether or not an operation will follow after a release. However, even in a case in which a user inputs with the intent of an operation made up of just the first input, if the waiting time has not passed the next processing will not be executed, so there are cases where tracking of user operations is poor.

SUMMARY OF THE INVENTION

An information processing apparatus according to an embodiment of the present disclosure, which can recognize a first operation made up of a first input and a second operation made up of the first input and an input that follows after the first input, includes a detecting unit to detect input from an operating object, and an output control unit to start a response corresponding to the first operation, after the first input from the operating object is detected by the detecting unit, regardless of existence of any input to follow after the first input, in a case that information relating to movement of the operating object moving in a direction parallel to an input subject face, which is the subject for the operating object to perform the first input, satisfies a predetermined condition.

Further features of the present disclosure will become apparent from the following description of exemplary embodiments with reference to the attached drawings.

BRIEF DESCRIPTION OF THE DRAWINGS

FIG. 3A is a diagram illustrating an example of a positional relationship between a touch panel used according to the present embodiment and a finger.

FIG. 3B is a diagram illustrating a state of around the finger in FIG. 3A as viewed upward from below.

FIG. 3C is a diagram illustrating a series of positional information in which the finger in FIG. 3A is detected in a proximity state after a double-tap is input.

FIG. 3D is a table including the touch positions illustrated in FIG. 3B and the relation information maintained in the event that a proximity position is detected.

FIG. 3E is a table including the touch positions illustrated in FIG. 3C and the relation information maintained in the event that a proximity position is detected.

FIG. 6A is a diagram illustrating a situation in which a user has performed a flick with a finger.

FIG. 6B is a diagram of an expanded view of around the central portion of FIG. 6A illustrating a situation in which the finger moves in a proximity state after the flick is input.

FIG. 6C is a table including information relating to a detected series of touch positions and the proximity positions thereof.

FIG. 7 is a diagram illustrating an example of allocating coordinates to graphical user interface (GUI) objects and physical objects.

FIGS. 12A and 12B are flowcharts describing examples of a processing flow to recognize an operation.

DESCRIPTION OF THE EMBODIMENTS

Embodiments relating to the present disclosure will be described in detail below, with reference to the attached diagrams. However, the components described in the embodiments herein are only examples, and are not intended to limit the scope of the present disclosure.

According to the present embodiment, determination is made as to whether a response as to a touch operation will be started, based on whether the movement distance meets predetermined conditions while an operating object after the touch input is in the state of approaching a subject face for touch input of the input unit, regardless of whether there is any following input. Note that, according to the present embodiment, "movement distance while in an approaching state" is the movement distance in the direction that is parallel to the subject face for touch input.

Figure 1A:
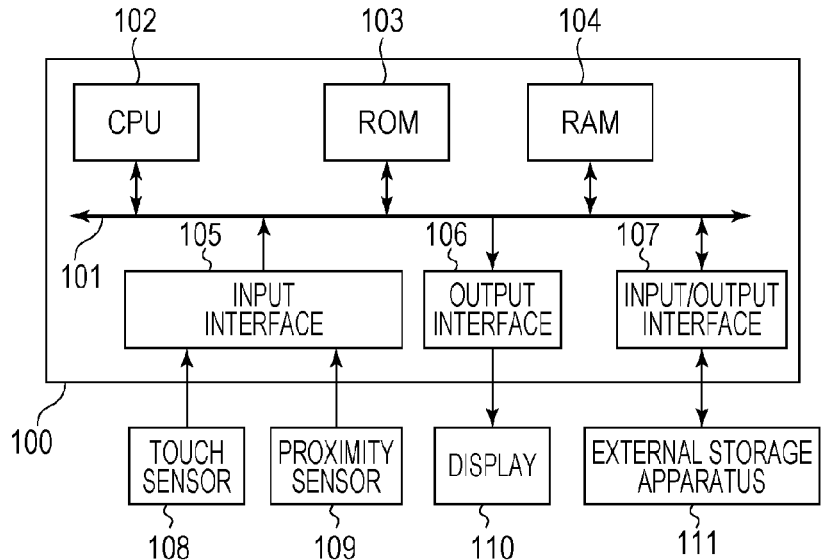
FIG. 1A is a block diagram illustrating an example of a hardware configuration of an information processing apparatus.

FIG. 1A is a diagram to illustrate an example of a hardware configuration of an information processing apparatus 100 relating to the present embodiment. A system bus 101 connects the components that make up the information processing apparatus 100, and mutual information exchange is performed. A central processing unit (CPU) 102 performs computation and logical determination for various types of processing, and controls the components that are connected to the system bus 101. Memory that includes program memory and data memory are loaded on the information processing apparatus 100. Read-only memory (ROM) 103 is program memory which stores program for control by the CPU 102 including various types of processing procedures, described later. Random access memory (RAM) 104 is data memory, and has a work area for programs to be executed by the CPU 102, a data evacuation area to be used in times of error processing, a loading area for the control program, and so forth. Program memory may be realized by loading the program to the RAM 104 from an external storage device via an input/output interface 107. As used herein, the term "unit" generally refers to any combination of software, firmware, hardware, or other component that is used to effectuate a purpose.

Now, an external storage device 111 may be realized by a medium (recording medium) and an external storage drive to realize access to the medium, for example. Such a medium may be a flexible disk (FD), a CD-ROM, a DVD, universal serial bus (USB) memory, a magneto-optical (MO) disk, flash memory, or the like, for example. Also, the external storage device 111 may be a server apparatus connected by a network, or the like. According to the present embodiment, important information is held in the RAM 104 or external storage device 111. An input interface 105 controls an input unit such as a pointing device, acquires an input signal, and notifies the system via the system bus 101. An output interface 106 outputs, to an output unit that has a display unit, at least a signal to control the output of the result of the later-described various types of processing that are executed. A touch sensor 108 detects a touch position as to an input subject face that the input unit has, and notifies the input interface 105. The touch sensor 108 may be a touch panel employing the resistive film method, electrostatic capacitance method, infrared radiation method, ultrasonic method, acoustic wave method, vibration detection method, or the like. Also, the position information to be defined on the input subject face may be acquired by detecting whether or not the input subject face has been touched, using a distance imaging sensor, stereo camera, or the like, which can detect a position in a three-dimensional space.

A proximity sensor 109 detects position information as to the input subject face, even in a state in which an operating object is in the proximity of the input subject face (a state in which the input subject face and the operating object exist in the proximity of each other while in non-contact), and notifies the input interface 105. Note that the position detection of an operating object which is in a proximity state may also be called detection in a hovering state or detection of a hovering position. The proximity sensor 109 may employ an electrostatic capacitance method, infrared method, ultrasonic method, or acoustic method touch panel, or the like. By increasing the sensitivity of the touch panel, position information can be detected even if the operating object is in a state of being in the proximity of the input subject face (hereinafter called a proximity state). Also, the position while in a state of being separated from the input subject face may be acquired by detecting a position in a three-dimensional space, such with a distance imaging sensor, stereo camera, or the like.

A display 110 displays the execution result of the processing in the information processing apparatus 100. The display 110 may be a liquid crystal display, television monitor, projector, or the like. According to the present embodiment, an electrostatic capacitance method touch panel is used for the touch sensor 108 and proximity sensor 109, and is overlaid on the display screen of the liquid crystal display, which is the display 110. That is to say, the touch panel surface which is installed on top of the display corresponds to the input subject face. Note that the signals of the touch sensor 108 and proximity sensor 109 may be notified together as signals that the touch panel outputs. The touch panel and liquid crystal display may be an integrated display with a built-in touch panel.

According to the present embodiment, the touch panel detects a position of contact on the face where that the operating object and touch panel surface are in contact, and identifies one coordinate point thereof as the touch position. Detection of a proximity state works much in the same way, using the detection method in which the detection sensitivity of the electrostatic capacity is increased. The position of the finger of the user that is approaching the touch panel surface is detected, and one coordinate point is identified as the proximity position. At this time, the position detected in the touch state and the position detected in the proximity state are distinguishable, and the touch panel notifies the information processing apparatus of the position information, along with the information that distinguishes the touch state and proximity state. According to the present embodiment, the proximity sensor 109 does not detect the proximity position of an operating object that is detected by the touch sensor 108 as touching the touch panel surface. It is important to note that the proximity position is in a non-contact state with the touch panel surface, and the position information of the leading end portion of the operating object (e.g., fingertip of user) approaching sufficiently to have the position information be detected is detected.

Figure 1B:
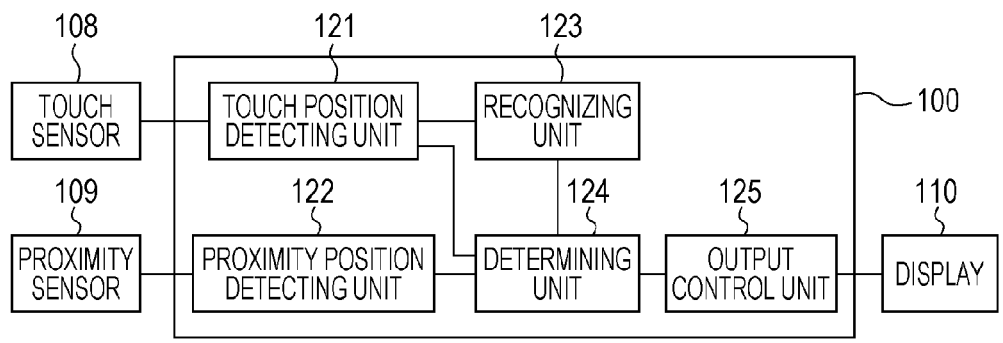
FIGS. 1B and 1C are block diagrams illustrating an example of a functional configuration of an information processing apparatus.

FIG. 1B is a block diagram illustrating an example of a functional configuration of the information processing apparatus 100 according to the present embodiment. Note that the present embodiment describes an example in which one or more fingers of the user are used as operating objects, but the processing performed is the same in the case that a user uses a stylus or the like.

First, the information processing apparatus 100 according to the present embodiment has a touch position detector 121, proximity position detector 122, recognizing unit 123, determination unit 124, and output controller 125. These functional units are realized by the CPU 102 loading the program stored in the ROM 103 to the RAM 104 and executing the processing according to the later-described flowcharts. However, the present disclosure may be similarly realized with an information processing apparatus that realizes the functional units herein using hardware. Each component will be described below.

The touch position detector 121 detects information relating to the touch position that is touched by the user, based on the signal notified from the input interface 105. In this event, according to the present embodiment, the input interface 105 references the touch position information that the touch panel serving as the input unit detects, at certain intervals, and sequentially notifies each signal to the touch position detector 121 as touch position information is acquired. Information relating to the touch position that the touch position detector 121 detects includes at least the position information of the touch event. A touch event is information representing the type of touch information that is notified. According to the present embodiment, at the time of notification of touch information according to an operating object newly touching the touch panel surface, or the touching continuing, an event called "TOUCH" is notified. Also, at the time of notification of touch information according to the operating object having been released from the touch panel, a touch event called "RELEASE" is notified. That is to say, in the case that the touch event is "TOUCH" the information to be notified includes coordinates information indicating the touch position where the operating object is touching. In the case of "RELEASE" the operating object is not touching the touch panel surface, so touch position information is not detected. According to the present embodiment, information relating to the touch position that the touch position detector 121 detects further includes information indicating the touch position or the time that the touch event is detected, and an identification (ID) to identify the touch position. An identifier that relates the order in which the touch position is detected is used in the ID, whereby managing is more simple in the case that there are multiple detected touch positions. Also, according to the present embodiment, the touch position detector 121 detects the latest touch position information based on the ID, and can detect that the touch position has moved, based on the touch position of the same ID being detected at a different position from the previously detected position. Note that the present embodiment may be applied to a detecting system in which a touch event called "MOVE" is notified at the time of notification of the touch information according to the touch position of the same ID being detected at a different position from the previously detected position.

The proximity position detector 122 detects information relating to a position while the operating object is in a state of approaching the input subject face (touch panel surface). Note that the proximity position detected here is the coordinates of the leading edge of the operating object (e.g. the fingertip of the user) on a two-dimensional plane that is parallel to the touch panel surface. According to the present embodiment, information relating to the position in the direction that is vertical as to the touch panel surface (the height direction) is not detected. Also, according to the present embodiment, a proximity position is not detected for an operating object that is touching the touch panel surface. However, in the case that the touch event notification acquired by the touch position detector 121 is "RELEASE", the operating object is separated from the touch panel surface. Accordingly, the proximity position may be detected by the proximity position detector 122 at approximately the same timing as the notification of the "RELEASE" event.

According to the present embodiment, the content of detection intervals of the touch position detector 121 and information notified by the proximity position detector 122 (touch event, ID, coordinate information indicating position, detection point-in-time, etc.) is unified into the same format, saved in the RAM 104, and processed. Note that information indicating that detection has been made while in the proximity state is added to notification information by the proximity position detector 122. For example, the value of the proximity flag is set to "ON".

The recognizing unit 123 recognizes a touch operation based on the touch position detected by the touch position detector 121. The recognizing unit 123 recognizes, for example, a single-tap, double-tap, triple-tap, swipe (an operation to trace the touch panel surface in a particular direction), flick (an operation to quickly move the finger over the touch panel surface and release), or the like, by one or more operating objects. Also, the recognizing unit 123 recognizes multi-touch operations such as pinching to enlarge or reduce the screen image (pinch-in, pinch-out) or rotating to rotate the screen image, and handwriting input operations to draw graphics or characters following the trail of touch positions, based on the relative distance and so forth of multiple touch positions by multiple operating objects. Note that in the case of recognizing a triple-tap, a second tap input following a tap that corresponds to a first input, and further a third input tap that follows is detected. Thus, there may be cases where input following the first input is multiple inputs.

The determining unit 124 determines whether or not to start the output without waiting for following input, based on whether a series of proximity positions detected by the proximity position detector 122 immediately after the finger is released by the user satisfies a predetermined condition. Specifically, the determining unit 124 determines that a touch operation is being continued in the case that predetermined conditions are satisfied, such as moving distance, moving speed, moving direction and so forth of the proximity positions. Now, in the case determination is made that the operation is not being continued, i.e. in the case determination is made that one touch operation is ended, the determining unit 124 immediately notifies the output control unit 125 of the content of the touch operation recognized by the recognizing unit 123, based on the touch position detected up until the finger is released immediately before. On the other hand, in the case determination is made that the operation is being continued, the determining unit 124 awaits information about the following touch position, and does not provide notification as to the output control unit 125.

The output control unit 125 controls the functional units of the informational processing apparatus 100 in order to respond as to the input operations. According to the present embodiment, the display image is generated based on at least the operation content notified from the determining unit 124, and is output to the display 110 which is an output unit.

Figure 2:
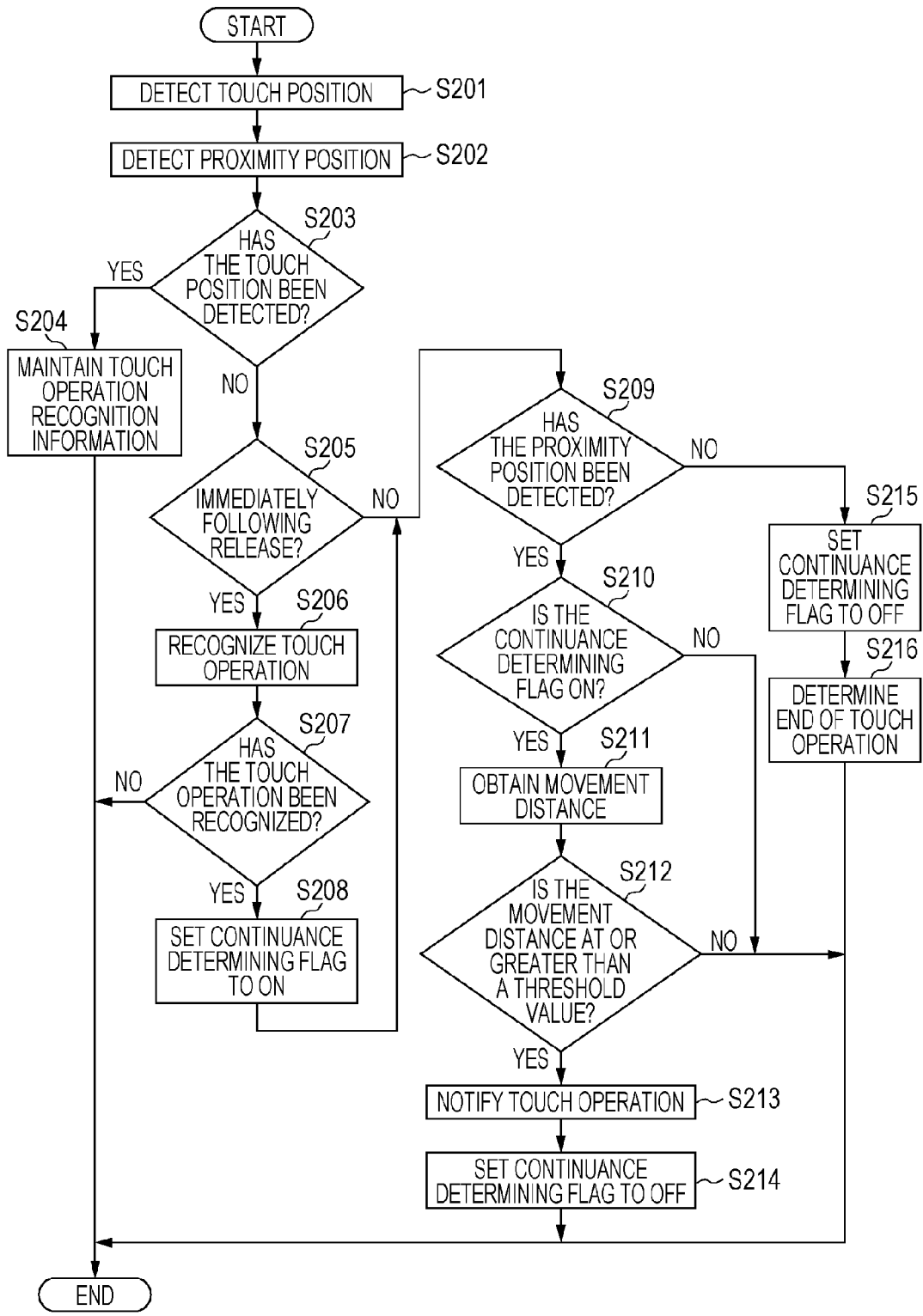
FIG. 2 is a flowchart describing an example of a processing flow wherein a touch operation is recognized.

FIG. 2 is a flowchart illustrating an example of processing flow in which the information processing apparatus 100 recognizes a touch operation according to the present embodiment. The processing in the flowchart in FIG. 2 is started according to notification being received from the input interface 105 with information about the touch position detected by the touch sensor, or with information about the proximity position detected by the proximity sensor. The processing in the flowchart in FIG. 2 is also started according to notification of a release being received from the input interface 105 that the touch position that had been detected by the touch sensor, or the proximity position that had been detected by the proximity sensor, is no longer detected. The notification of the touch position information and notification of the release are made by referencing the latest sensor state, at a predetermined time interval, so the processing in the flowchart in FIG. 2 is repeated at a predetermined time interval.

First, in step S201, the touch position detector 121 detects information relating to a touch position. The touch position detector 121 detects the touch position information notified from the input interface 105 based on information detected by the touch sensor 108. Also, in the case there is notification from the input interface 105 of a release, the touch position detector 121 detects that the operating object, which had been touching the touch position corresponding to the detection time thereof, has been separated. The touch position detector 121 holds the detected information in the RAM 104. According to the present embodiment, the RAM 104 holds at least the information at the time that a touch position of a certain ID is first detected and last detected. Accordingly, in the case that movement is detected for a touch position of an ID that is already detected, the information of the last detected touch point is updated by the newly detected information. In the case that there is no operating object touching the touch panel surface, there is no information notification from the touch sensor 108 of the touch position, so the touch position detector 121 does not detect a touch position.

Next, in step S202, the proximity position detector 122 detects information relating to proximity positions. The proximity position detector 122 detects information of the proximity position notified from the input interface 105 based on the information detected by the proximity sensor 109. Also, in the case that the operating object that had been detected in the immediately prior detection is not approaching the touch panel surface, a release of the proximity position is notified from the input interface 105. In the case of such a notification, this means that the operating object has separated sufficiently from the input subject screen. The proximity position detector 122 holds the detected information in the RAM 104. In this event, information indicating that detection is made in a proximity state is held, in addition to ID, coordinate information indicating position, and detection point-in-time and so forth. For example, the proximity flag may be set "ON". In the case there is no operating object approaching the touch panel surface (including cases in which the operating object is touching the touch panel surface), there is no notification from the proximity sensor 109 of proximity position information. Accordingly, the proximity position detector 122 does not detect a proximity position.

In step S203, the recognizing unit 123 determines whether or not the touch position detector 121 has detected the touch position in step S201. In the case that the touch position detector 121 has detected the touch position (YES in step S203), the processing is advanced to step S204. On the other hand, in the case that the touch position detector 121 has not detected the touch position (NO in step S203), the processing is advanced to step S205.

In step S204, the recognizing unit 123 extracts and holds, as information for recognizing a touch operation, information accumulated in the RAM 104 that relates to the touch position detected by the touch position detecting unit 121. Specifically, for example, information held in the RAM 104 that satisfies a predetermined condition is read out to a dedicated storage area, or the touch operation information flag is set to "ON" and distinguished from information not used in the operation, therefore identified as being subject to processing. The predetermined conditions may be information that the proximity flag is "OFF", information of touches detected within a recent predetermined time, and the like.

In step S205, the recognizing unit 123 determines whether or not the point-in-time herein is immediately following the release of the operating object, i.e. whether or not the point-in-time herein is immediately following detection of the first input. Determination of whether or not the point-in-time herein is immediately following the release, determination is made according to whether or not the last notified event is "RELEASE", based on history of the touch events notified in step S201. Also, for example, if the touch flag is set to be "ON" during the time that the touch position is detected, and if the touch flag remains "ON" when the touch position is no longer detected, determination can be made that touching had been performed at the previous notification time, i.e. the point-in-time is immediately following the release. The touch flag may be set to "OFF" after the determination that the point-in-time is immediately following the release. In the case that determination is made by the recognizing unit 123 that the point-in-time is immediately following the release (YES in step S205), the processing is advanced to step S206. On the other hand, in the case that determination is made that the point-in-time is not immediately following the release (NO in step S205), the processing is advanced to step S209. In step S206, the recognizing unit 123 references information to recognize the touch operation held in step S204, and recognizes the touch operation input by the user. The recognizing unit 123 a touch operation that is correlated to a command that instructs various types of processing executed by the information processing apparatus 100, and dictionary information in which the touch position conditions that make up the touch operation are registered, and determines whether or not the conditions are satisfied by the detected information. Also, of the multiple touch operations included in the dictionary information, the touch operation that is determined to match the information to recognize the touch operation in the RAM 104 is recognized as the touch operation input by the user. The dictionary information includes information such as threshold values of moving distance and moving time of touch positions and distance between the touch positions as the conditions for flicking and pinching to be recognized, information indicating forms for handwriting commands, and so forth.

Note that in the case that a certain touch operation has been recognized already by the processing in step S206, the touch operation is recognized again according to the series of inputs including the information of the following input. Accordingly, in the case that the processing in step S206 is executed immediately following the release of the first input, the first operation, which is made up by the first input that has been input until immediately prior, is recognized. In the case that the processing in step S206 is executed immediately following the input following the first input, a second operation, which is made up of the first input and the input following thereto, is recognized. Note that in the case that the information to recognize the touch operation in the RAM 104 does not match any of the touch operations registered in the dictionary information, the recognizing unit 123 does not identify a touch operation. In step S206, the touch information input by the user is identified in the touch operations registered beforehand in the dictionary information, whereby the touch operation is deemed to be recognized.

At this stage, command issuance and notifications corresponding to the identified touch operation is not made. Note that according to the present embodiment, the touch operation is recognized at the point-in-time that is determined to be immediately following the release (step S205), but the touch operation may be recognized during input at a timing before the release (step S204). At which timing to make the determination is selected appropriately according to the touch operations registered beforehand in the dictionary information. The dictionary information according to the present embodiment includes an operation that is made up of a first input (includes one touch and one release, and the movement of the operating object therebetween), such as a single-tap operation. Additionally, an operation that is made up of a first input and an input that follows (includes multiple touches and releases, and movement of the operating object therebetween), such as a double-tap, is included.

In step S207, the determining unit 124 determines whether or not the touch operation has been recognized in step S206. That is to say, according to the present embodiment, determination is made as to whether or not the touch operation input by the user is identified by the recognizing unit 123 as a touch operation registered in the dictionary information. In the case determination is made that the touch operation is recognized (YES in step S207), the processing is advanced to step S208. On the other hand, in the case determination is made that the touch operation is not recognized (NO in step S207), the processing to recognize the touch operation is ended. In this case, the processing of the flowchart in FIG. 2 is started again according to the touch position or proximity position to be detected next, and similar processing is repeated until a touch operation is recognized.

In step S208, the determining unit 124 sets a continuation determining flag, which indicates that operation continuance will be determined based on the next detected proximity position, is set to "ON", and holds the information in the RAM 104. Thus, according to the present embodiment, a decision is made to determine whether or not to start output as to the touch operation without waiting for a following input, according to the touch position no longer being detected by the touch position detector 121 because the operating object is released. A flag indicating this is then set.

On the other hand, in step S209, the determining unit 124 determines whether or not the proximity position detector 122 has detected a proximity position in step S202. In the case determination is made that a proximity position has been detected (YES in step S209), the processing is advanced to step S210. On the other hand, in the case determination is made that a proximity position has not been detected, such as in the case that a release notification is received in step S202 (NO in step S209), the processing is advanced to step S215.

In step S210, the determining unit 124 determines whether or not the held continuance determining flag is "ON". In the case determination is made that the continuance determining flag is "ON" (YES in step S210), the processing is advanced to step S211. Thus, information of the proximity position detected at or after the point-in-time when the touch position is no longer detected by the touch position detector 121 can be used to determine whether to start output as to the touch operation without waiting for following input, using the continuance determining flag. On the other hand, in the case determination is made that the continuance determining flag is "OFF" (NO in step S210), the processing to recognize the touch operation is ended. In the case that the continuance recognizing flag is not "ON", this is because the detected proximity position is not detected at or after the point-in-time when the touch position is no longer detected, such as immediately prior to the touch operation. In this case also, the processing in the flowchart in FIG. 2 is started again according to the touch position or proximity position to be detected next, and similar processing is repeated.

In step S211, the determining unit 124 uses the proximity position detected in step S202 to acquire the movement distance that the operating object has moved while continuing the proximity state. Note that the movement distance acquired here is movement distance in a direction that is parallel to the input subject face. Specifically, the rectilinear distance from the proximity position first detected after the release at the touch position to the proximity position last detected is acquired as the movement distance. This is a combination of positions at which the effect of movement is significant, and the amount of calculations has been reduced. Note that the method to acquire movement distance is not limited to this. For example, a series of detected proximity positions may be held, an average line acquired from the distribution of proximity positions, and the movement distance of the average line acquired. Thus, the movement distance can be acquired without including blurring at the time of detecting the proximity positions. Also, the previous proximity position may be held, the movement distance from the previous proximity position to the current proximity position acquired, and added to the movement distances acquired up to now. Thus, the actually moved distance can also be acquired. According to the present embodiment, position information about the proximity position based on the coordinate axis in the direction intersecting the input subject face (height direction as to the subject face) is not acquired. Note that in the case of using a system that can detect the proximity position in the height direction as to the input subject face, the movement distance may be acquired while taking into account the position information of the height direction.

Thus, in the case that the operating object is separated from the input subject face far away in the height direction, determination is made that a following operation will not be input. However, if a case in which the leading edge of the operating object exceeds a criterion height is determined as "the operating object is separated far away from the input subject face in the height direction", an inconvenience may occur. That is to say, this places a constraint on the user to the effect that "in order to perform following input, do not lift your finger higher than a criterion height", which may make operability poor. Accordingly, by making a determination based on the movement direction in the direction that is parallel to the input subject face as according to the present embodiment, the user having ended an operation input can prioritize the visibility of the display screen, and determine that there is a high probability that the finger has been moved away from the input subject screen. The description above is all using movement distance, but similar processing can be performed using movement speed instead of movement distance.

In step S212, the determining unit 124 determines whether or not the movement distance acquired in step S211 is greater than a preset threshold value. The threshold for the movement distance used here is a threshold to determine whether a touch operation has ended or has been continued. According to the present embodiment, in the case that the movement distance is greater than the threshold, this is seen as having a high probability that the operating object is moved away from the touch panel, and therefore the user has ended the operation, and is seen as having a low probability that a consecutive touch, which would make up one touch operation, will be input. This is because generally, in the case that the operation is ended, moving away from the touch panel is more natural in order for the content output on the display to be visible, rather than the operating object waiting in the proximity of the position at which the operation has been performed. On the other hand, in the case that the movement distance is smaller than the threshold, this is seen as having a high probability that the user is in process of inputting one touch operation, and therefore has the finger waiting in the proximity of the touch panel surface. In the case determination is made that the movement distance is greater than the threshold (YES in step S212), the processing is advanced to step S213. In the case determination is made that the movement distance is less than the threshold (NO in step S212), the processing to recognize a touch operation is ended. The processing in the flowchart in FIG. 2 is started accordance to the touch position or proximity position detected next, and the processing according to whether or not a following touch input is detected is repeated.

In step S213, the recognizing unit 123 executes processing corresponding to the touch operation recognized in step S206, and thereby notifies the output control unit 125 of instructions corresponding to the recognized touch operation. Thus, the output control unit 125 starts a response as to the touch operation recognized in step S206, and updates the display content on the display 110. In step S214, the determining unit 124 sets the continuance determining flag to "OFF". The processing in step S214 is executed in the case that the input touch operation is finalized. Accordingly, the series of information relating to the touch position and proximity position that are held in the RAM 104 is deleted.

On the other hand, in step S215, the determining unit 124 sets the continuance determining flag to "OFF". The processing in step S215 is executed in the case that the proximity position, which is used to determine whether input will be continued or not, is no longer detected. In this case, there are two possibilities, described below. That is to say, there is a possibility that the user has moved the operating object by a great distance so that the object is far away from the touch panel, i.e. that there has been a movement of a sufficiently greater distance than the threshold. Also, there is a possibility that, while detection by the proximity position detector 122 according to the present embodiment is difficult, a movement distance sufficient to exceed the threshold may not occur in the direction parallel to the input subject face. For example, there may be a case in which movement occurs in the direction intersecting the touch panel surface, or a case in which an operation is performed in the proximity of a boundary of the touch panel.

Accordingly, in step S216, the recognizing unit 123 determines whether or not a touch operation has ended, based on information other than the proximity position, and notifies the touch operation. According to the present embodiment, the determination is made based on whether or not a following touch is detected after a predetermined amount of time has passed since a touch position is released.

In the case that a predetermined amount of time has passed since the touch position is released, instructions corresponding to the recognized touch operation is notified to the output control unit 125 in order for the processing corresponding to the touch operation recognized in step S206 to be executed. Thus, the output control unit 125 starts a response as to the touch operation recognized in step S206, and the display content on the display 110 is updated. Thus, according to the present embodiment, even in a case where the operating object is no longer in the range in which the proximity position can be detected, as long as the movement distance in the direction parallel to the input subject screen does not exceed a threshold, the input operation is not finalized until a predetermined amount of time has passed. For example, if the sensitivity of the proximity sensor 109 is low, the height at which a proximity position can be detected may be limited to a very small range. In such a case, when a user attempts to perform a double-tap, there is a high probability that, even if after the first input the operating object is outside of the range in which the proximity position can be detected, the operating object will reenter the range in order to input following input after the first input. Accordingly, finalizing the operation as having no following input just because the operating object after the first input has exited the range in which the proximity position can be detected can be a cause of erroneous operations. Accordingly, if the movement distance in the direction parallel to the input subject face of the operation object in a proximity state does not exceed the threshold, then even in a case that the proximity position can no longer be detected, erroneous operations can be reduced until a predetermined amount of time has passed, by not finalizing the input operation. Note that in the case that the sensitivity of the proximity sensor 109 is high and the size of the range in which the proximity position can be detected is sufficient, a touch operation may be notified in step S216 without providing condition determining processing.

Note that according to the present embodiment, in step S208 the continuance determining flag is set to "ON" in any case, but a processing step to determine whether or not to set to "ON" the continuation determining flag may be added, according to the type of touch operation recognized in step S206. For example, in an information processing apparatus 100 in which a single-tap operation and double-tap operation are registered in the dictionary information, in the case that the recognized touch operation is a single tap, there is a possibility of the user tapping again immediately afterwards in order to input a double-tap. Accordingly, the continuance determining flag is set to "ON". If a touch operation made up of a first input and a following input, other than double-tap", is not included in the dictionary information, in the case that a touch operation other than a tap is recognized, the continuance determining flag may be set to "OFF". Accordingly, the processing in step S209 and thereafter may be omitted, and the touch operation recognized by the recognizing unit 123 may be notified to the output control unit 125.

Also, according to the present embodiment, in step S212 determination is made as to whether or not a touch operation will be notified quickly according to the result of one determination of whether or not the movement distance in the proximity state is at or above the threshold, but the present disclosure is not limited to this. For example, while the threshold of the movement distance of the proximity position is set to a small value, in the case that the movement distance from the previous position to the current position of the proximity positions detected at each predetermined interval, or the movement speed thereof, exceeds the threshold at a predetermined number of consecutive times, determination may be made that a following operation will not be input. There may be cases in which determination in this manner is faster than waiting for the straight line distance between the first proximity position and the last proximity position to exceed a large threshold. Also, in the case that the movement direction is in a roughly identical direction over a predetermined number of consecutive times, determination may be made that a following operation will not be input.

As described above, the information processing apparatus 100 according to the present embodiment quickly distinguishes whether the user has ended the touch operation or whether an operation made up of a first input and an input following thereto is being continued, and performs processing.

Note that in the case of recognizing an operation made up of inputs three or more consecutive times, such as a triple-tap or the like, the processing described above is repeated each time the operation object is released.

First Operating Example

Now, a first operating example of a user operating the information processing apparatus 100 according to the first embodiment will be described in detail here.

FIGS. 3A through 3E illustrate examples of a series of a touch position and proximity position detected in the event of a tap being performed. FIG. 3A is a diagram illustrating an example of the positional relationship between the touch panel used for the present embodiment and a finger. An input region 300 of the touch panel surface handles the touch position and proximity position as coordinate information, using the upper-left facing the diagram as the origin, and a plane of coordinates having a width of 960 dots in the x-axis direction and 540 dots in the y-axis direction. The resolution of the touch panel matches that of the display, and is measured in units of dots. The detection information of the touch position and proximity position is notified from the input interface 105 every 20 ms. Note that the input region 300 may be the entire touch panel surface serving as an input subject face, or may be a partial region within the input subject face. The user finger 301 serving as the operating object inputs a single-tap operation or a double-tap operation as to the input region 300. FIG. 3B is a diagram illustrating the proximity of the finger 301 in FIG. 3A in the state of view upward from the bottom. FIG. 3B illustrates a state in which the finger 301 has input a single tap while in the position illustrated in FIG. 3A, and subsequently the finger 301 moves while in a proximity state, whereby a series of proximity positions are detected. FIG. 3D is a table holding the relation information held in the event that the touch positions and proximity positions illustrated in FIG. 3B are detected.

Similarly, FIG. 3C is a diagram illustrating a series of position information that is detected after the finger 301 in FIG. 3A inputs a double-tap while in a proximity state. FIG. 3E is a table holding the relation information held in the event that the touch positions and proximity positions illustrated in FIG. 3C are detected.

First, processing that is executed by the information processing apparatus 100 in the event of the finger 301 approaching the input region 300 for the user to touch, regardless of single-tap or double-tap, will be described. First, in the case that the finger 301 approaching the proximity sensor 109 during the time up to the user touching the touch panel with the finger 301 is detected, the proximity positions are notified to the information processing apparatus 100 via the input interface 105. Thus, the processing (the flowchart in FIG. 2) to recognize the touch operation is started. Note that since the touch operation has not started yet, the processing is ended by the processing of NO in steps S203 and S205, YES in step S209, and NO in step S210, and the next notification will be awaited.

Next, the touch sensor 108 detects the finger 301 in accordance with the user advancing the finger 301 and touching the input region 300, whereby the touch position is notified to the information processing apparatus 100 via the input interface 105. Thus, the processing to recognize the touch operation in the flowchart in FIG. 2 is started. In this case, the touch position detector 121 detects the touch position notified via the input interface 105 (step S201). The proximity position detector 122 attempts to detect a proximity position, but at this time the operating object is in a touching state, so a proximity position is not detected (step S202). The recognizing unit 123 then determines that a touch position has been detected (YES in step S203), holds the information for the touch operation to be recognized, and ends the processing to recognize the touch operation (step S204). Hereinafter, each time the touch position information is notified every 20 ms, the processing to recognize the touch operation is started, and similar processing is repeated until the finger 301 is released.

The operations up to this point are the same for a single-tap operation and double-tap operation. Hereinafter, a case in which a single-tap operation is performed and a case in which a double-tap operation is performed, both having a threshold of 20 dots as the movement distance used to determine whether to start the output as to the touch operation without waiting for a following input, will be described.

First, processing that is executed by the information processing apparatus 100 according to the present embodiment in the case of a user performing a single-tap operation will be described with reference to FIGS. 3B and 3D. Point 311 is a touch position, and is the touch position detected immediately prior to the user separating the finger 301 from the input region 300 in the event of inputting single-tap. In order to simplify the description, let us say that the detection point-in-time at this time is 0 ms. In accordance with the touch position herein being detected, the processing of YES in step S203 and the processing in step S204 are executed as described above. Next, the points 312 through 316 are a series of proximity positions, and are positions of the finger 301, which had separated from the input region 300 after the user inputting a single-tap released the finger 301 from the input region 300, detected by the proximity sensor 109. The detected proximity positions are notified to the information processing apparatus 100 via the input interface 105.

The processing of the flowchart in FIG. 2 is started in accordance with the first proximity position 312 being notified. The operating object is not touching the touch panel, so a touch position is not detected but the proximity position detector 122 detects a proximity position (step S202). Now, the recognizing unit 123 does not detect a touch position (NO in step S203), and determines that this is immediately following a release (YES in step S205). Further, the recognizing unit 123 recognizes a single-tap operation using the first detected touch position and point-in-time that are held in step S204 and the last detected touch position and point-in-time (step S206). For example, in the case that the movement distance from the first touch position to the last touch position is within the threshold, and the elapsed time from the time that the first touch position is detected to the time that the last touch position is detected is within the threshold, this is recognized as a single-tap. Note that only a single-tap is given in the example here, but it goes without saying that the process can be applied to other operations.

Next, the determining unit 124 determines that a single-tap has been recognized (YES in step S207), and sets the continuance determining flag to "ON" (step S208). The proximity position is detected (YES in step S209) and the continuance determining flag is set to "ON" (YES in step S210), whereby the determining unit 124 finds the movement distance while in the proximity state (step S211). Note that, since only the proximity position of point 312 is detected at this time, the movement distance is 0 and does not exceed the acquired threshold (NO in step S212), and ends the processing to recognize the touch operation.

Next, upon the proximity position 313 being notified, the processing to recognize the touch operation is started, and up to step S205 the processing is executed similar to the description using the proximity position 312. However, this is not immediately following a release. Accordingly, processing is advanced in the order of NO in step S205, YES in step S209, and YES in step S210. The movement distance is acquired by the determining unit 124 as approximately 6.08 dots, from the first proximity position 312 (397, 299) held the time before to the proximity position 313 (403, 298) this time (step S211). The determining unit 124 ends the processing to recognize a touch operation, since the acquired movement distance of approximately 6.08 dots does not exceed the threshold of 20 dots, and awaits input of the next touch.

Next, upon the proximity position 314 being notified, the processing to recognize the touch operation is started, and advances similar to the description using the proximity position 313, up to step S211. The movement distance from the first proximity position 312 (397, 299) that is being held to the current proximity position 314 (410, 284) is acquired as approximately 21.74 dots (step S211). The movement distance of approximately 21.74 dots acquired this time exceed the threshold of 20 dots (YES in step S212), so the determining unit 124 notifies a single-tap, which is the touch operation recognized in step S206, to the output control unit 125 (step S213). The determining unit 124 sets the continuance determining flag to "OFF" in order to stop the continuous determining, and ends the processing to recognize a touch operation (step S214). As illustrated in FIG. 3D, the detection time of the proximity position 314 is 60 ms after the point-in-time of 0 ms at which the last touch position of the single-tap operation is detected.

Subsequently, even if the proximity positions 315 through 316 are notified, the continuous determining flag is set to OFF, so in step S210 the processing is advanced to NO, and the continuance determining processing is not performed.

Thus, in the case that the user has input a single-tap, the movement distance of the finger in a proximity state increased in order to move the finger out of the way after the tap input. In this example, determination can be made quickly that a single-tap operation has been input, after 60 ms from the last detected point-in-time of a touch position.

Next, an example of a case in which a double-tap is input will be described with reference to FIGS. 3C and 3E. Point 321 is a touch position, and is a touch position that is detected immediately prior to the user releasing the finger 301 from the input region 300 after having input a first tap that makes up a double-tap operation. In the event that the touch position herein is detected, the processing to recognize the touch operation is, as described above, executing the processing as YES in step S203 and the processing in step S204. Points 322 through 325 are proximity position, and are detected by the proximity sensor 109 from the time that the user inputs the first tap until the user temporarily separates the finger 301 from the input region 300 and then touches again. The detected proximity positions are notified to the information processing apparatus 100 via the input interface 105. Point 326 is a touch position, and is the touch position at which the user has touched the finger 301 to the input region 300 again in order to input the second tap of a double-tap.

First, the processing performed in the case of the proximity position 322 being notified is the same as in the case of the proximity position 312 in FIG. 3B, so will be omitted.

Upon the proximity position 323 being notified, the processing to recognize the touch operation is started, and is processed similar to the description using proximity position 313. Note that, in step S211, the movement distance from the first proximity position 322 (400, 301) that is being held until the current proximity position 323 (400, 299) is acquired as approximately 2.00 dots. The acquired movement distance of approximately 2.00 dots does not exceed the threshold of 20 dots (NO in step S212), whereby the processing to recognize the touch operation is ended, and the next operation is awaited.

Hereinafter, each time information about the proximity positions 324 through 325 is notified, the movement distance is acquired following the same processing. The movement distance from the proximity position 323 to the proximity position 324 (402, 298) is 4.24 dots, and the movement distance to the proximity position 325 (402, 297) is 5.24 dots, neither exceeding the threshold of 20 dots.

Upon the touch position 326 being notified, the processing to recognize the touch operation is started, and processing to recognize the second tap is executed. Subsequently, upon the second tap being released, the double-tap is recognized in step S206. Subsequently, similarly, continuance determining of the proximity state is performed, and in the case determination is made that there is no continuation, the double-tap is notified immediately, and during the time that determination is made that there will be continuation, the third tap is awaited for a triple-tap. Note that in the case that, for example, a triple-tap is not included in the touch operations registered beforehand in the dictionary information, the continuance flag is set to "OFF" in step S208, and notification may be performed as to the output control unit 125 as having recognized a double-tap.

Also, the movement distance of the proximity position is calculated using a straight line distance, but the movement distance may be calculated separated for the x-axis direction and the y-axis direction. Thus, calculations of squares and roots can be omitted, and calculation time can be shortened. Further, by setting separate thresholds for the x-axis and y-axis, subtle changes to the amount of movement of the finger 301 due to the aspect ratio differences in the input region 300 can also be managed.

Thus, in the case of a user attempting to input a double-tap, the finger is waiting for the next operation after inputting a tap, so the movement distance in the proximity state is small. By determining this, the next operation can be awaited. Also, for taps from a multi-touch that uses two or more points, continuance determining can be performed by finding the movement distance at the proximity positions that correspond to the multiple operating objects and comparing these to the threshold. In the case of multi-touch, it is desirable to determine that a following operation will be not continued, only in a case where the movement distance of all of the proximity positions are less than the threshold.

As described above, according to the present embodiment, upon recognizing the touch operation, determination is made as to whether or not the movement distance in the proximity state of separating the operating object from the input subject screen is great, so determination is made as to whether or not a following operation will be consecutively input. In the case that the movement distance in the proximity state is great, there is a high probability that the user has ended the operation and moved the finger, so output as to the touch operation recognized from the information relating to the touch position detected until immediately prior will be quickly instructed. In the case that the movement distance in the proximity state is small, there is a high probability that the user is causing the finger to wait in order to continue input of an operation, so the next input is awaited without notifying a touch operation. The determining method herein is particularly effective in the case of determining an operation in which the touch starting position of the first input and the following input are expected to be the same or in the proximity of each other. Thus, indicating feedback as to the operation quickly in the case of not having to wait for the next input can be performed in accordance with the intent of the user, thereby reducing the possibility of not following the operation. Depending on the apparatus, there are situations where both single-tap operations and double-tap operations are effective, and situations where only single-tap operations are effective, due to application differences and the like. In this case, in situations where only single-tap operations are effective, a following input does not have to be awaited, so a quick response as to the touch operation is often made. According to the present embodiment, a quick response can be made as to a single-tap operation in situations where either a single-tap operation or double-tap operation is effective, so the user does not readily sense the awkwardness of a different operational feeling for each situation.

According to a second embodiment, determination is made as to whether or not a following input will be made, based on whether the movement direction of an operating object in the proximity state after having separated from a touch input subject face of an input unit, following a touch operation, satisfies a predetermined condition. More specifically, description of a method will be made for which the next touch position (the starting position of the next input) in order for the operating object to continue the operation is identified, and in the case of the operating object moving in the direction facing the position thereof in a proximity state, determination is made that the operation is being continued. According to the second embodiment, even in a case in which the operating object moves by a great distance in the proximity state in order to input multiple touch inputs consecutively that make up one touch operation, whether the touch operation is ended or whether the touch operation is being continued can be quickly distinguished.

Figure 1C:
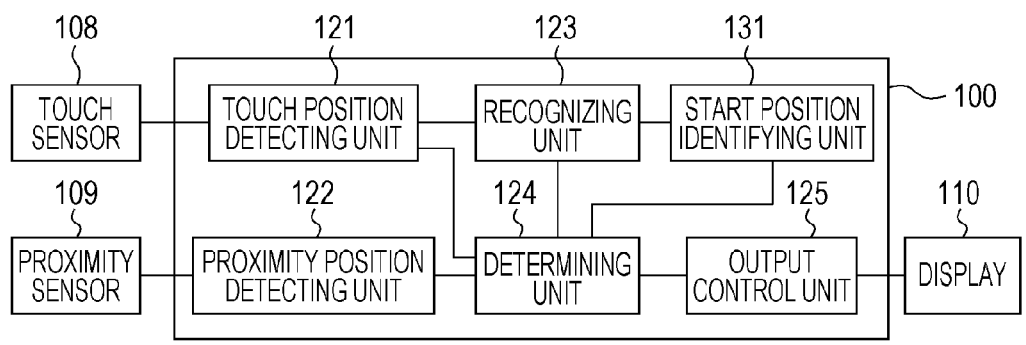

The hardware configuration of the information processing apparatus 100 relating to the second embodiment is the same as in FIG. 1A of the first embodiment, so the description thereof will be omitted. FIG. 1C is a block diagram illustrating an example of a functional configuration of the information processing apparatus 100 according to the present embodiment. Note that components that are the same as in FIG. 1B are denoted by the same reference numerals, and description thereof will be omitted.

A starting position identifying unit 131 identifies a starting position of an operation that has the possibility of a consecutive input next, based on a series of touch positions detected by the touch position detector 121 or a touch operation recognized by the recognizing unit 123. In the case that there are multiple operations having the possibility of a consecutive input next, multiple starting position candidates are also identified. The determining unit 124 acquires the movement direction in the proximity state based on the proximity positions detected by the proximity position detector 122, and determines whether or not the movement direction is particular direction facing the starting position that has been identified by the starting position identifying unit 131. In the case that the movement direction is the direction of the starting position, determination is made that the next operation will be input, and awaits the next operation. In the case that the movement direction is not in the particular direction toward the starting position, determination is made that the operation is completed, and the touch operation content recognized by the recognizing unit 123 is notified to the output control unit 125.

Figure 4:
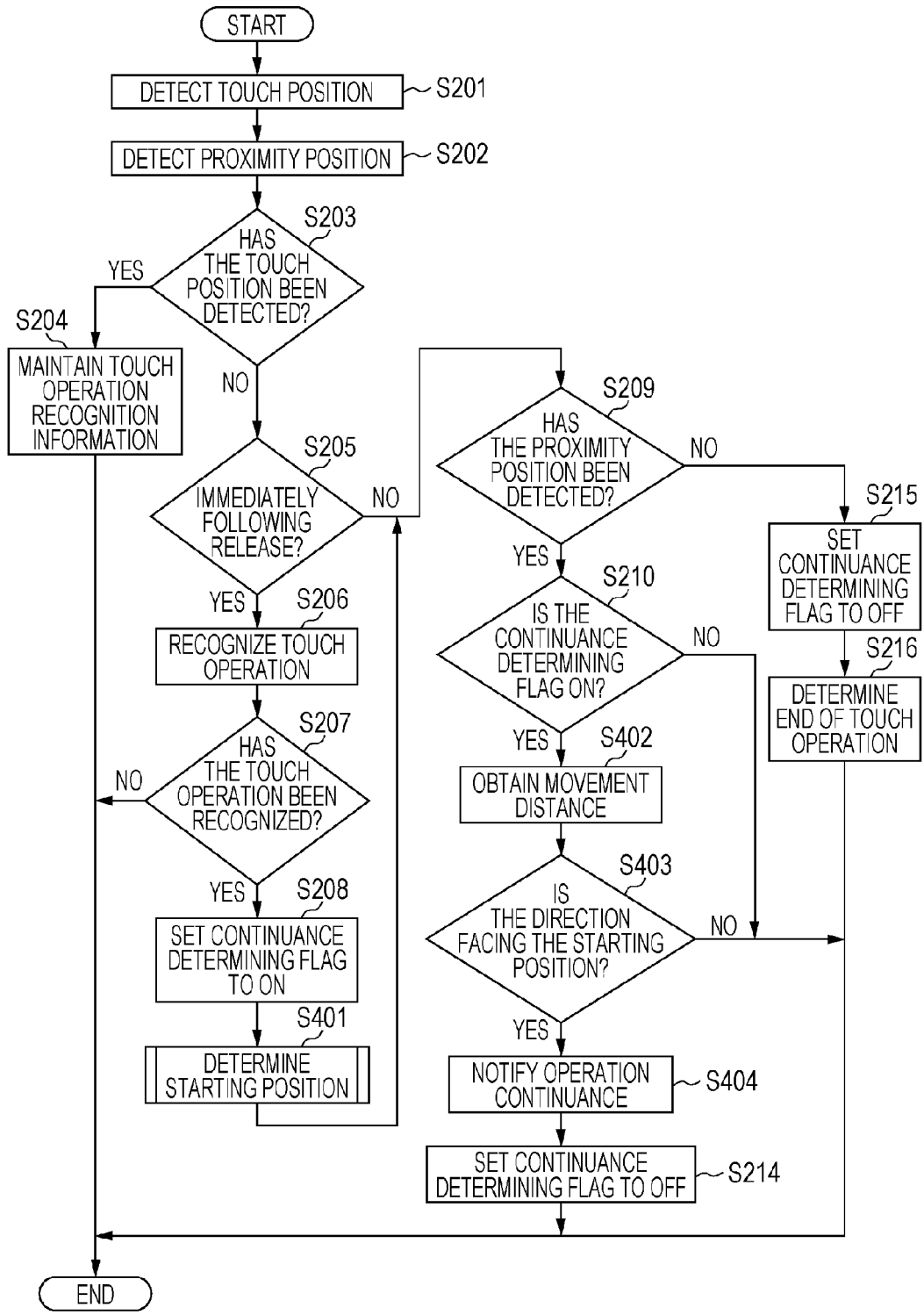
FIG. 4 is a flowchart describing an example of a processing flow wherein a touch operation is recognized.

FIG. 4 is a flowchart describing an example of processing flow for the information processing apparatus 100 to recognize a touch operation. Note that processing that is the same as in FIG. 2 are denoted by the same reference numerals, and description thereof will be omitted.

Step S401 is executed in the case that a touch operation input by a user is recognized. The starting position of an operation having the possibility of the next input is identified, based on a series of touch positions detected in step S201 by the starting position identifying unit 131 or touch operations recognized in step S206. Details of processing will be described later.

Step S402 is executed in the case that a proximity position is detected and the continuance determining flag is set to ON. The determining unit 124 acquires the movement direction in the proximity state, using the series of proximity positions detected in step S202.

In step S403, the determining unit 124 makes determination as to whether or not the movement direction acquired in step S402 is in the direction facing the starting position identified in step S401. In the case determination is made that the movement direction is the starting position direction (YES in step S403), the processing is advanced to step S404. In the case determination is made that the movement direction is not the starting position direction (NO in step S403), the processing to recognize the touch operation is ended.

In step S404, the determining unit 124 notifies each module of the information processing apparatus 100 that the operation will be continued. Thus, by reading ahead for the next operation, the threshold of the next operation may be modified for easier determination, and the state of the system and preparation for screen displays can be performed in advance.

Note that in the case of advancing to NO in step S403, the flow may be advanced to step S216 as if determination is made that an operation will not be continued. Also, according to the present embodiment, control can be added according to the relevance between the two independent touch operations, by determining whether to start output as to the touch operation without waiting for continued input based on the information of the movement direction in the proximity state. For example, in the case that the same operation is repeatedly input, the control is to adjust the threshold and waiting time in accordance with the number of repeats. Thus, in the case that a response as to the first input does not have to be awaited until the next input, the continuance determining flag is set to "ON" in step S208, and the recognized touch operation can be quickly notified.

Also, the proximity positions immediately following being in the proximity state are often blurred, so the first predetermined number of proximity positions may be ignored. Alternatively, the movement direction at the time of touch operation may be acquired, and changes to the proximity positions toward the direction thereof may be ignored.

Also, in order to reduce the effects of the blurring of the proximity positions, the movement direction may be acquired after a predetermined number of proximity positions are notified, or the movement direction may be acquired after the movement exceeds a predetermined movement distance.

FIGS. 5A through 5D are flowcharts illustrating examples of flow of the starting position identifying processing executed in step S401. Which of the identifying methods of A through D, or combination thereof, will be used as parallel processing, is selected based on the operation content registered in the dictionary information serving as operations that are recognizable by the information processing apparatus 100.

Identifying Method A

Figure 5A:
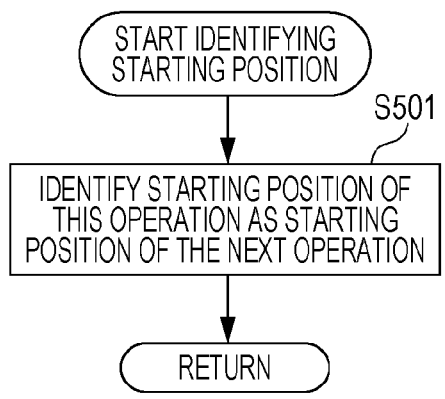
FIGS. 5A, 5B, 5C, and 5D are flowcharts illustrating examples of a starting position identifying processing flow.

First, FIG. 5A illustrates a case in which touch inputs of the same operation are repeatedly input. This is particularly effective in cases where movement in a state that the operating object is touching the touch panel is included in the repeated operations.

In step S501, the starting position identifying unit 131 identifies the starting position of the touch input that has been input until immediately prior as a starting position having the possibility as being input as the next operation. Specifically, the touch position that is first touched is identified as the starting position for the touch operation recognized in step S206 in FIG. 4. That is to say, of the series of touch positions detected by the touch position detector 121 until immediately prior, the touch position detected first is the starting position. Note that the touch position that is touch first may be one that is held in step S204.

For example, in many of the information processing apparatuses in which touch operations can be recognized, an operation called a flick is used in the case of switching an image displayed on a screen. A flick is an operation to move the finger on the touch panel surface at high speed and release. A condition to distinguish a flick and a swipe, generally, is that the movement speed at the touch position immediately prior to the finger being released has to exceed a predetermined threshold. In a case where an image that the user desires is searched for, flicks are consecutively input, to input instructions to switch images one after the next. During the time that the images are being switched one after the next, if high-resolution data is rendered on a display each time a flick is performed, there may be cases in which the load is unnecessarily great or time is taken for the user to grasp the content of the images. Note that in the case that the user fixes aim on a desired image to display and inputs only once, or in the case of slowly repeating the input, it is desirable for the user to be quickly provided with a browsing environment, by the rendering processing of the high resolution image data being performed as a priority. To resolve such an issue, performing determination based on the movement direction of the operating object acquired from the staring position and proximity position identified based on the flowchart in FIG. 5A enables distinguishing of whether the user has ended the touch input or is in process of a repeated input. Accordingly, the timing to start processing of which the load is great can be appropriately determined in accordance with the notification in step S404. For example, regarding changes to the display images from a flicking operation, rendering processing of the high resolution data can be quickly started from the point in time that the end of the operation is finalized. If repeated input is in process, the next input flicking operation is awaited while the renderings of low-resolution images and thumbnail images are performed, whereby the processing load can be reduced, and the user can view the content of the images. Also, in the case of desiring to switch the images one after the other by flicking, the finger has to operate back and forth at high speed, whereby the user has a tendency to be rough in the input, whereby cases readily occur in which the conditions for recognition of a flick are not satisfied. To resolve such an issue, by determining beforehand that a flick will be input again, determination based on the movement direction of the operating object acquired from the proximity position enables measures such as adjusting the threshold in accordance with the notifications in step S404.

Second Operating Example

A second operation example will be described in detail, in which a user operates the information processing apparatus 100 which identifies the starting position of the next touch input using the identifying method A according to the second embodiment.

FIGS. 6A through 6C illustrate an example of a series of touch positions and proximity positions detected in the event that a flick is performed. FIG. 6A illustrates an example of a situation in which the user performs a flick with the finger 301 serving as the operating object. Points 601 and 602 are touch positions detected in the order of numerals thereof, touch position 601 is the touch position first touched for the flick operation, and touch position 602 is the last touch position of the flick operation. FIG. 6B is a diagram expanding the center area of FIG. 6A, and is a diagram illustrating a situation in which the finger moves in a proximity state after the flick has been input. Points 611 through 615 are proximity positions detected in the order of numerals thereof, and point 611 is in the proximity position detected immediately after the finger 301 is released at the touch position 602 in FIG. 6A, and therefore matches the coordinates of the touch position 602. Also, point 616 is the touch position that the user has touched again in order to input a consecutive flick operation. The coordinates of the touch positions and proximity positions and the conditions for notification intervals and the like between the touch positions and proximity positions are the same as in FIG. 3. FIG. 6C illustrates the information relating to the series of touch positions and proximity positions that has been detected. The point-in-time of the user starting a touch in order to start the first flick is 0 ms.

First, the touch sensor 108 detects the touch position 601 and the touch position 601 is notified to the information processing apparatus 100 via the input interface 105, whereby processing to recognize the touch operation (the flowchart in FIG. 4) is started. The touch position is detected here, so in step S204 the information necessary to recognize a touch operation is held and the processing is ended. Hereinafter, similar processing is repeated until the touch position 602 is detected.

Next, upon the user completing the flick, and immediately after releasing the finger 301 from the input region 300, the proximity sensor 109 detects the finger 301 as the proximity position 611 (step S202). Upon the proximity position 611 being notified to the information processing apparatus 100 via the input interface 105, processing to recognize the touch operation is started. This is immediately following the release, so recognition of the touch operation is performed in step S206, and recognized as a flick. Specifically, for example the movement distance and movement speed and the like for the touch position are acquired based on the information held in step S204, compared to threshold values set beforehand, and determined to be a flick if the conditions are satisfied. According to the present embodiment, there is no processing command in the dictionary information registered beforehand, to instruct processing that differs from a flick input, from a combination of an input that is input after a flick. Accordingly, in the case that a flick operation is recognized in step S206, the next input does not have to be awaited, whereby the flick operation is quickly notified to the output control unit 125, and simultaneously the continuance determining flat is set to "ON" (step S208). Following this, the processing in FIG. 5A is executed as the starting position determining processing. The position information being held of the touch position 601 is identified as the starting position of the next operation (step S501). At first the only proximity position detected is the proximity position 611, so movement direction is not acquired (step S402). Note that the direction from the proximity position 611 toward the identified starting position is acquired (step S403). An arc tangent will be used to describe one example of a method to acquire the direction. Thus, when advancing in the x-axis direction, i.e., advancing in the right direction as to the input region 300 is 0 degrees, and as the movement direction shifts in a clockwise direction, the angle thereof increases. The direction from the proximity position 611 (514, 236) to the touch position 601 (400, 300) which is the starting position is an angle of approximately 150.69 degrees as obtained from the arc tangent. The angle is also held. At this time, movement direction is not acquired so step S403 is determined to be NO, and the processing is ended.

Upon the proximity position 612 being notified, the movement direction from the proximity position 611 held in step S402 toward the proximity position 612 is acquired. Using an arc tangent to acquire this also, the angle is approximately 150.64 degrees. In step S403, determination is made as to whether or not the difference between the approximately 150.64 degree angle acquired in step S402 and the 150.69 degree angle to the starting position held in step S402 is within a predetermined threshold. According to the present operating example, the predetermined threshold is 20 degrees, and in the case that the absolute value of the difference in angles is within 20 degrees, this is determined to be the same direction. Since the absolute value of the difference in angles here is 0.05 degrees, this is within the threshold, and is determined to be the same direction. Thus, information to the effect that the operation will be continued is notified to each of the modules in the information processing apparatus in step S404. Information to the effect that specifically another flick will be input may be notified here. Thus, loosening the threshold to determine whether or not the touch operation to be input next is a flick facilitates moving to a flick. Also, according to the present operating example, in the case that the same operation is repeatedly input, awaiting a response until the next operation is input is not necessary. Accordingly, notification of the flick may be made at the point in time that the flick is recognized in step S206, or when the continuance determining flag is set to "ON" in step S208.

Identifying Method B

Figure 5B:
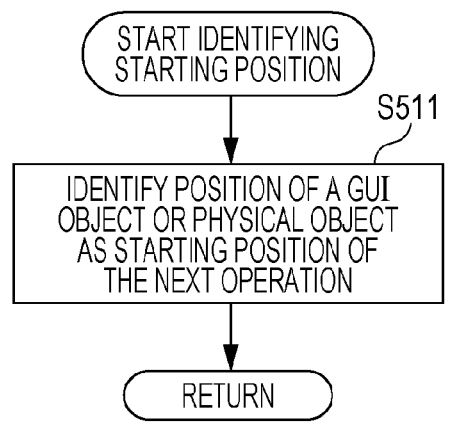

Next, FIG. 5B supposes a case in which a graphical user interface (GUI) object or physical button is operated as a consecutive operation from the touch operation.

In step S511, the starting position identifying unit 131 identifies the position at which a GUI object is displayed or the installation position of a physical object as the starting position of a touch which has the possibility of being the next input. A physical object refers to a physical button or physical dial, and the position thereof is handled as coordinate information allocated by mapping to a coordinate system of the touch panel and display.

FIG. 7 is a diagram illustrating an example of a situation in which coordinates are allocated to GUI objects and physical objects.

A GUI object 701 is an OK button, and has the coordinates of (600, 480) allocated thereto. In step S511 in FIG. 5B, determination is made as to whether or not the proximity position is moving toward these coordinates, whereby determination can be made as to whether or not the OK button will be operated. The coordinates to be allocated may be the coordinates of the centroid of the GUI object, for example. In the case that identifying the position accurately is desired, circumscribing rectangle information of the GUI object may be held as the vertical and horizontal coordinates, or all of the coordinate points that the GUI object renders may be held. Similarly, the coordinates of (800, 480) are allocated to the GUI object 702. Note that a GUI object is not limited to a button, and may be any object disposed on a screen, such as an on-screen image, text, radio button, check box, combo box, slider, text area, text field, and the like.

A physical object 703 is a MENU button, and has the coordinates of (1100, 200) allocated thereto. The presence of the physical object is outside of the screen, but the direction thereof can be acquired by virtually allocating a coordinates system, similar to the screen. Similarly, coordinates are also allocated to the physical objects 704 and 705. Note that a physical object is not limited to a button, and may be any object that is operated by a finger, such as a dial, zoom lever, or the like.

Note that since the presence of the physical object is outside of the screen, the coordinates may have a negative value. For example, there are cases in which a GUI is provided such that object selection is performed by tapping a portion of multiple GUI objects displayed on a display. In the case that a selection operation is ended, it is desirable for a response to start quickly. However, if the user wants to continue selection further, having a response start during an operation is bothersome. Accordingly, in such a case, based on the flowchart in FIG. 5B, the direction in which a certain GUI object in an unselected state is displayed is identified as the starting position, and based on the movement direction of the operating object acquired from the proximity position, determination is made as to whether the selection operation will be continued. Accordingly, the length of waiting time until the response starts can be controlled, in accordance with the notification in step S404.

Also, for example, in a case in which the size of a display is small or the like, controlling an indicator displayed as a GUI in a precise manner with touch operations by a finger may be difficult. In such a case, a user interface may be provided so as to enable the rough value instructed by the GUI on the touch panel to be finely adjusted by the operation of a physical button (e.g. a cursor key). At this time, in the case that the user desires to use the value instructed by the touch operation on the GUI, it is desirable for the setting processing to quickly end without operating a physical key. On the other hand, in the case of desiring to perform fine adjustments with a physical key, the user needs to be given enough time to separate the finger from the touch panel and move the finger to the physical key. In such a case, determination that the user will use a physical key can be made beforehand, based on the starting position identified based on the flowchart in FIG. 5B and the movement direction of the operating object acquired from the proximity position. Accordingly, whether or not to await an operation from a physical button can be controlled in accordance with the notification in step S404.

Identifying Method C

Figure 5C:
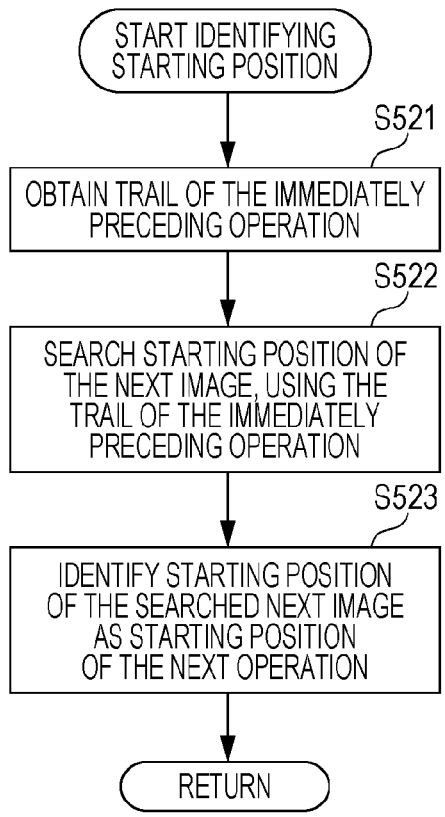

Next, FIG. 5C supposes an operation in which multiple strokes are input, such as a handwriting gesture, handwritten shape, handwritten character input, and the like.

In step S521, the starting position identifying unit 131 acquires a trail of touch positions recognized in step S206 in FIG. 4, i.e. a series of touch positions that make up a trail.

In step S522, the starting position identifying unit 131 uses the trail that is input immediately prior to acquiring in step S521, to retrieve the starting position of the trail that corresponds to the next stroke from the dictionary information of handwriting recognition characters stored beforehand.

In step S523, the starting position identifying unit 131 identifies the starting position of the next stroke, which is retrieved in step S522, as a touch starting position that has the possibility of being input next.

Operations using a touch input as to a touch panel include an operation called handwriting character input, in which a character is input by handwriting, recognized by the information processing apparatus 100, changed from handwriting to type, and output. In the case of handwriting character input, there are cases in which a different character is recognized depending on whether the next stroke will be input or not. For example, the character "E" is the character "F" with a horizontal line added as a fourth stroke. In the case of inputting "E", character recognition processing has to wait until the fourth horizontal line is input, but in the case of inputting "F", it is desirable for the recognition result to be output quickly. In cases such as handwriting character input, there are cases in which the ending position and starting position of a touch input, which are in a time sequence relation, are away from each other. In such a case, based on the starting position identified based on the flowchart in FIG. 5C and the movement direction of the operation object acquired from the proximity position, determination can be made beforehand that the user will input the next stroke. Accordingly, whether or not to await the start of the character recognizing processing can be controlled in accordance with the notification in step S404.

Third Operating Example

Now, a third operating example will be described in detail, in which a user operates the information processing apparatus 100 to identify the starting position of the next touch input by the identifying method C according to the second embodiment. FIG. 8 is a diagram illustrating an example of a trail detected in the event that handwriting character input is performed.

Figures 8A, 8B:
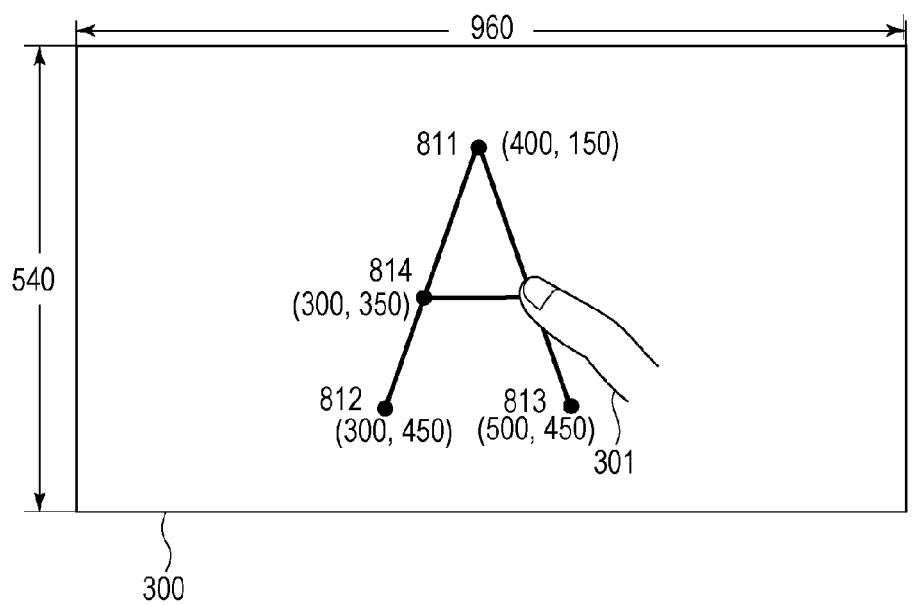
FIG. 8A is a diagram illustrating an example of adding, to a dictionary for recognizing handwritten characters, information indicating the starting position of the next stroke.
FIG. 8B is a diagram illustrating an example of a trail of a character "A" that a user has actually input.

FIG. 8A is an example of adding information indicating the starting position of the next stroke to the dictionary for recognizing handwritten characters. FIG. 8B is an example of a trail of the character "A" that a user has actually input. 801 through 804 are touch positions indicating the starting position and ending position of each trail to input the character "A".

In order for the user to draw the first stroke of the character "A", let us say that user has drawn a trail with a finger 301 from touch position 811 (400, 150) to touch position 812 (300, 450), and separated the finger 301 from the input region 300. At this time, the trail data input in step S521 in FIG. 5C is acquired, and matching with the dictionary data in FIG. 8A is performed in step S522. In order to compare the input trial with the dictionary data, normalizing to a coordinate system of 100 dots×100 dots, a trail will have been drawn toward the lower left from (100, 0) to (0, 100). By being normalized, comparing this to the table in FIG. 8A we can see that the number of strokes "1" matches for the character "A". Thus, we can see that the starting position of the next stroke in the normalized coordinate system is (100, 0). Returning this to the actual coordinate system, the starting position is (400, 150). An example of the calculation method to return to the actual coordinate system will be described in detail. First, the ratio of the actually input trail and the trail of the normalized dictionary data is obtained. The ratio in the x-axis direction is found by dividing the distance in the x-axis direction of the trail input (300−400=−100) by the distance in the x-axis direction of the dictionary data (0−100=−100), whereby the result is 1. Similarly, the ratio in the y-axis direction is found by dividing the distance in the y-axis direction of the trail input (450−150=300) by the distance in the y-axis direction of the dictionary data (100−0=100), whereby the result is 3. Thus, we can see how large the actual trail is in each of the x-axis direction and y-axis direction as to the normalized dictionary data. Next, the different in distance from the end position of the dictionary data to the starting position of the next stroke is acquired. The results are 100−0 making 100 in the x-axis direction and 0−100 making −100 in the y-axis direction. If this is multiplied by the ratio acquired earlier, the distance of the difference is also converted to the actual coordinate system. The results are 100×1 making 100 in the x-axis direction and −100×3 making −300 in the y-axis direction. The coordinates of the next stroke in the actual coordinate system can be obtained by add this to the end position of the actually input trail. The results are 300+100 making 400 in the x coordinate, and 450−300 making 150 in the y coordinate. Thus, the coordinates indicated before (400, 150) can be acquired.

Also, the calculation amount may be reduced by obtaining beforehand the ratio of the trail of the dictionary data and the distance to the starting position of the next stroke. Specifically, the ratio in the x-axis direction is obtained by dividing the distance from the ending position of the dictionary trail to the starting position of the next stroke (100−0=100) by the distance from the starting position of the dictionary trail to the ending position (0−100=−100), and the result thereof is −1. Note that in the case that the distance from the starting position to the ending position, which is the denominator, is 0, the result will also be 0. Similarly, the ratio in the y-axis direction is obtained by dividing (0−100=−100) by (100−0=100), and the result thereof is −1. This ratio is multiplied by the distance from the starting position to the ending position of the trail that is actually input, and added to the coordinates at the ending position of the actually input trail, whereby the starting position of the next stroke in the actual coordinate system can be obtained. The distance from the starting position to the ending position of the actually input trail (300−400=−100) is multiplied by the ratio of −1, which becomes 100, and adding this to the coordinate 300 of the ending position of the actually input trail, the x-coordinate will be 400. Similarly, for the y coordinate, (450−150=300) is multiplied by the ratio of −1, resulting in −300, and adding this to the coordinate 450 of the ending position of the actual input trail results in 150. The coordinates (400, 150) indicated above can be acquired with this method also. The ratio herein depends only on the dictionary data, so this ratio can be held beforehand in the dictionary data. For example, as illustrated in the example of the ratio in FIG. 8A, the calculation amount can be reduced by holding the ratios of each of the x-axis and y-axis beforehand. In step S523, the acquired starting position of the next stroke is identified as the starting position of the next operation. Thus, determination can be made as to whether or not the movement direction in the proximity state in step S403 in FIG. 4 and the direction toward the acquired starting position are roughly matching. In the case that the directions are roughly matching, determination can be made that the next stroke will be input as the next operation. Thus, a character can be recognized after waiting for the next stroke input. For example, "F" and "E" can be distinguished by determining whether or not the movement direction in the proximity state after the third stroke of "F" is the direction of the starting position of the fourth stroke of "E". In the case that the movement direction in the proximity state is not the direction of the starting position of the fourth stroke of "E", at that point-in-time, information to the effect that the character is "F" may be notified immediately.

Note that in the case that the area to input a character is small, the approximate starting position of the next stroke may be held in the dictionary. Also, in step S206 in FIG. 4, the starting position of the next stroke may be identified at this point in time as the first stroke of the character "A" being recognized.

Identifying Method D

Figure 5D:
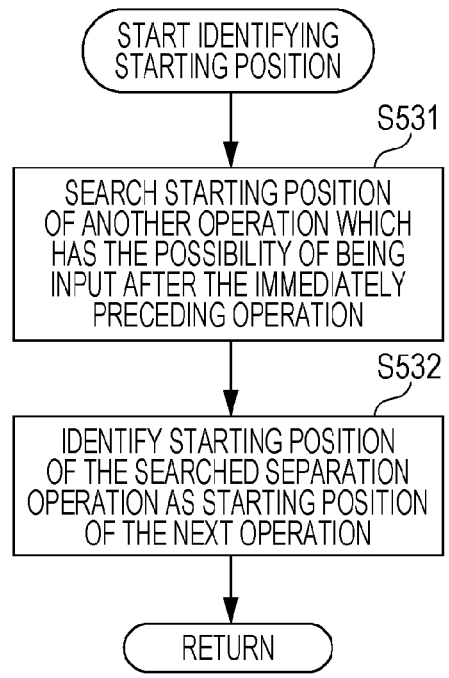

FIG. 5D supposes a case in which different touch operations are combined and consecutively input. In step S531, the starting position identifying unit 131 retrieves the starting position of a separate operation having the possibility of being input after the touch operation recognized in step S206 in FIG. 4 from the dictionary information which is stored beforehand. According to the present embodiment, the starting position of a trail that can be input next, which is held in the dictionary information corresponding to a trail made up of a series of touch positions detected by the touch position detector 121 up until immediately prior, is retrieved.

In step S532, the starting position identifying unit 131 identifies the starting position of the other operation retrieved in step S531 as a touch starting position having the possibility of being input next.

For example, in a case in which the size of the information processing apparatus 100 is small and physical buttons or many GUI objects cannot be disposed, or in a case in which a touch operating environment wherein display content can be input without visual confirmation is to be provided, multiple touch operations can be combined to handle various types of processing. In such cases, the touch input that the user will input next is estimated, based on the starting position identified based on the flowchart in FIG. 5D and the movement direction of the operation object acquired from the proximity position, so commands of which the probability of input is high can be narrowed down. Accordingly, even in cases where touch operations correspond to various types of processing, in accordance with the notification in step S404, the response processing can be quickly started in accordance with the end of the touch operation.

Fourth Operating Example

Figures 9A, 9B:
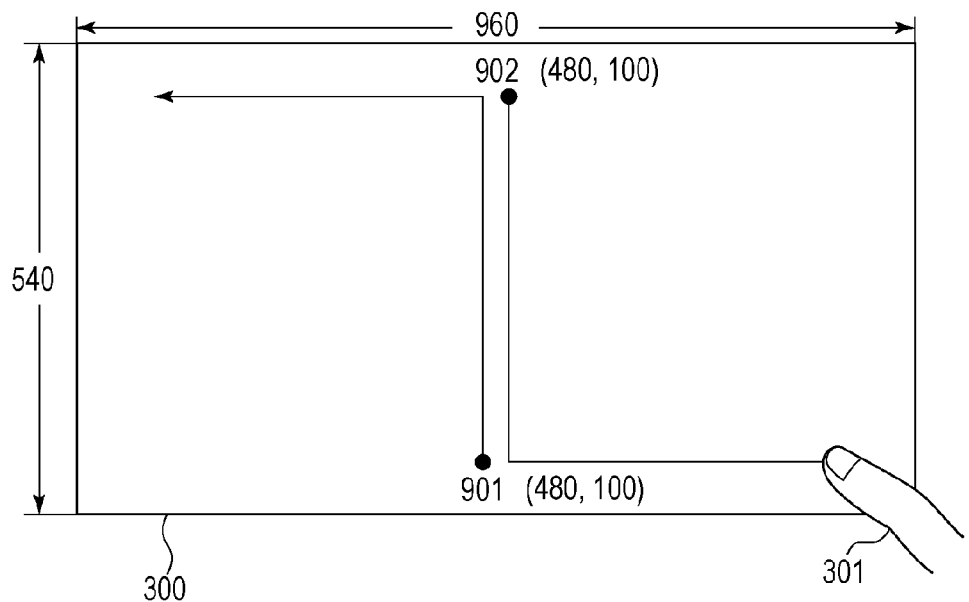
FIG. 9A is a table in which the starting position of another operation with the possibility of being input after each handwriting gesture is stored.
FIG. 9B is a diagram illustrating an example of an actually input handwriting gesture.

Now, a fourth operating example in which a user operates the information processing apparatus 100 to identify the starting position of the next touch input, with the identifying method D in the second embodiment, will be described in detail. FIGS. 9A and 9B are diagrams illustrating an example of a trail detected in the event that a handwriting gesture input is performed. FIG. 9A is a table holding the starting positions of other operations having the possibility of being input after each handwriting gesture. FIG. 9B is an example of a handwriting gesture that is actually input.

First, as illustrated in FIG. 9B, in the case that a handwriting gesture which starts from touch position 901 is input, such as "advance in the upward direction then advance in the left direction", the starting position of other operations having the possibility of being input next is retrieved in step S531 in FIG. 5D. Specifically, upon retrieving the data in FIG. 9A, we can see that there are three other operations that have the possibility of being input after "advance in the upward direction then advance in the left direction". We can also see that the starting position of the other operations will be one of (480, 440) or (480, 100). In step S532, the starting position of the retrieved other operations are identified as the starting position of the next operation. In the example in FIG. 9B, after "advance in the upward direction then advance in the left direction", a gesture is input from the touch position 902 (480, 100) to "advance in the downward direction then advance in the right direction". In this case, when "advance in the upward direction then advance in the left direction" is input and the finger 301 is separated from the input region 300, determination is made in step S403 in FIG. 4 that the movement direction in the proximity state is the direction of the starting position of the next operation, whereby an operating continuance notification is performed in step S404.

Note that the operation that is input is not limited to handwriting gestures, and general touch operations may be input. Also, in the case of a touch operation that does not use the entire input region, identifying where the next separate operation will be input is difficult, but patterns of consecutive operations are determined in accordance with habits of the user and the applications used, whereby the patterns thereof may be learned, and the next operation starting points may be managed.

Also according to the present embodiment, the identifying method D may be applied to a multi-touch operation, and determination may be made that the next operation will be continued in a case in which each of the proximity positions corresponding to multiple operating objects are all advancing in the direction of the starting position of the next operation. Also, there may be only one starting position of the next operation if the next operation is such that all points are advancing in the same direction, or in a case such as a pinching operation where the starting position are in different directions, separate starting positions may be set.

As described above, according to the present embodiment, after the touch operation is recognized, determination is made as to whether or not the movement direction in the proximity direction where the operating object is separated from the input subject screen is the starting position for the next operation, whereby determination is made as to whether or not the next operation be consecutively input. In the case that the movement direction in the proximity state is the direction of the starting position of the next operation, information to the effect that the next operation will be input is notified, whereby processing to wait for the next operation, processing to simplify determining of the next operation, and processing to prepare for the next operation and the like can be executed.

In the transformation example of the above-described embodiment, an example is described in which, a region which is easy for a touch operation to be input, made up of a first input and an input following thereto, is finalized within an input subject screen, so processing to determine whether or not the touch operation output is started without waiting for the following input when unnecessary can be omitted. Note that the transformation example can be executed with the first and second embodiments combined together.

The hardware configuration of the information processing apparatus 100 according to the transformation example is similar to FIG. 1A in the first embodiment, so description thereof will be omitted. The functional configuration of the information processing apparatus 100 according to the transformation example includes a region storage unit that is added to FIG. 1B of the first embodiment and FIG. 1C in the second embodiment. The region storage unit is connected to the determining unit 124, and the determining unit 124 can perform operation continuance determining based on the stored region.

Figure 10A:
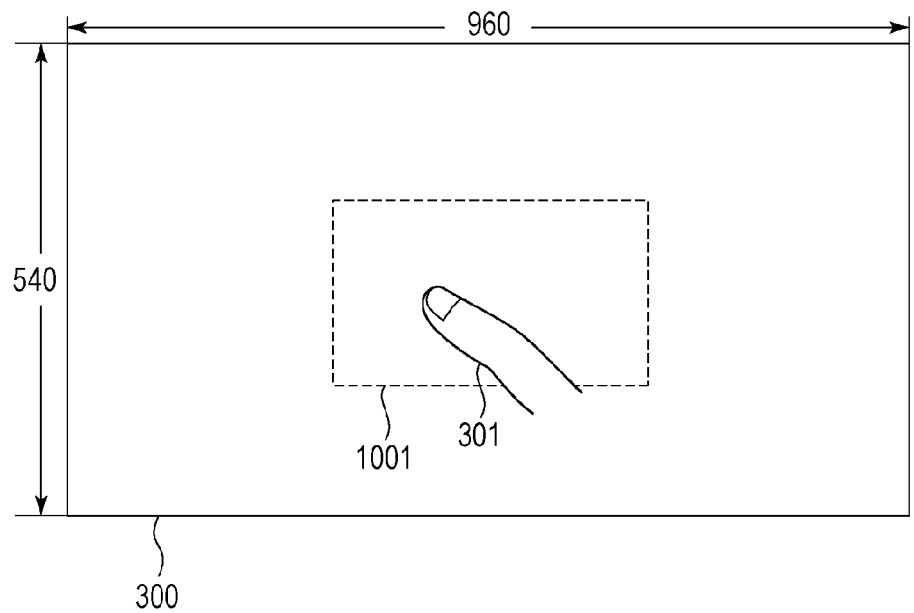
FIG. 10A is a diagram illustrating an example of a touch panel provided with a tapping operation region in the center portion thereof.

FIG. 10A is a diagram describing an example of a touch panel provided with a tap operating region 1001 in the center thereof. The information processing apparatus 100 according to the transformation example has, for example, a double-tap operation registered beforehand in the dictionary information as an operation that instructions the display image to be expanded. The region 1001 in FIG. 10A is an operating region, and according to the example in FIG. 10A is set as a region having a high probability of a double-tap being input. An expanding operation of an image by double-tapping allows double-tapping anywhere on the screen when the image is displayed over the entire screen, so users often double-tap on the center of the screen. Accordingly, the tap operating region 1001 is provided in the center portion of the screen in the example in FIG. 10A. Note that this example supposes a case in which the hand that the user uses to instruct the apparatus itself and the hand to input the touch operation are different hands. Depending on the type of device, it may feel natural to support the apparatus with one hand and simultaneously input touch operations. In such a case, the operating region may be set at a position for the thumb of the hand holding the apparatus to easily press (such as the edge of the screen).

Thus, a region storage unit is stored as an operating region that each operation is easily input, corresponding to each operation. In the case that an operation correlating within an operating region is input, the determining unit 124 awaits the next operation, as there is a possibility for the same operation to be repeated. On the other hand, in the case that an operation is input outside of the operation region, or in the case that an operation is input which is not correlating within the operating region, determination does not have to be made as to whether or not to start outputting without waiting for the following input, and the touch operation corresponding to the detected touch information is quickly notified. In the example in FIG. 10A, in the case that a tap operation is recognized based on the touch position detected within the operating region 1001, the probability of the next tap being input as a double-tap is high, so the next input is awaited. On the other hand, in the case that a tap operation is recognized based on the touch position detected outside of the operating region 1001, the probability of a double-tap is low, so information to the effect that a single-tap operation has been input is quickly notified to the output control unit 125. Note that in FIG. 10A, the operating region 1001 is a rectangular shape, but should not be limited to this, and any shape may be used such as a circle, triangle, or matching the shape to an object on the screen, as long as region determining can be performed.

Figure 10B:
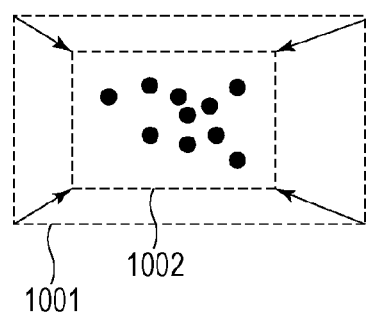
FIGS. 10B and 10C are diagrams illustrating a method to correct the operation region, according to actually confirmed operation positions.
Figure 10C:
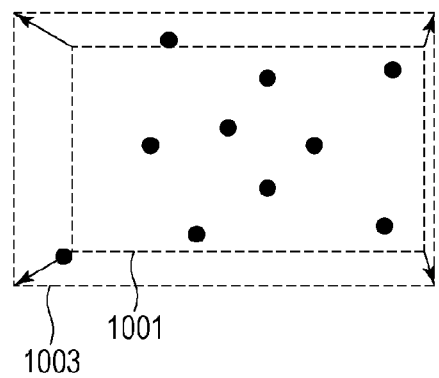

Also, a processing to correct the operating region 1001 each time a touch operation is notified, i.e. each time an input operation is finalized, may be added. FIGS. 10B and 10C illustrate an example of a method to correct an operating region 1001 in accordance with the position of the actually finalized operation. In this case, a region correcting unit is added to FIG. 1B of the first embodiment and FIG. 1C of the second embodiment, and is connected to the region storage unit, as a functional configuration. The region correcting unit corrects the position, size, shape, and the like of the operating region 1001 from the shift between the position of the actually finalized operation and the position of the operating region 1001 at the time thereof. FIG. 10B illustrates a case in which a double-tap has been input in an actually narrower region than the set operating region 1001, for example. Therefore, the region correcting unit narrows the stored operating region 1001 an operating region 1002 and notifies this to the region storage unit, and the region storage unit stores the operating region 1002 corresponding to the tap. At this time, the operating region 1001 may be destroyed. FIG. 10C illustrates a case in which a double-tap has been input in an actually wider region than the set operating region 1001, for example. Therefore, the region correcting unit widens the stored operating region 1001 an operating region 1003 and notifies this to the region storage unit, and the region storage unit stores the operating region 1003 corresponding to the tap. At this time, the operating region 1001 may be destroyed. Note that correcting the region is preferably performed after a certain amount of coordinate information of finalized operations has been accumulated.

As described above, according to the present embodiment, by storing a region that has a high probability of having a touch operation input, determination can be made that there is a high probability of a touch operation being consecutively input within the region thereof. Thus, within the region, the next operation input can be awaited according to the intent of the user, and outside of the region, processing can be executed immediately as to the input according to the intent of the user.

A third embodiment will be described using an example to detect a three-dimensional position of an operating object, rather than separately detecting a touch position and proximity position with a different detecting unit as in the first and second embodiments. The third embodiment can be effectively used with an information processing apparatus that recognizes, based on three-dimensional position information, a touch operation that a user performs as to a GUI on a display image that is projected onto a flat surface which does not use a sensor, such as a screen or table top or the like, for example.

Also in the case of detecting a three-dimensional position of an operating object, determination is made as to whether an operation performed by touching the input subject face (projection face, surface of physical object, etc.), or an operation performed by approaching to the extent of being deemed to touch, is ended, or will be continued, based on the movement in the proximity state. Note that a proximity state (non-contact state) in the case of detecting a three-dimensional position is defined as a state in which there is more distance between the operating object and the input subject face that in the case of determining that the operating object is barely touching the input subject face.

Figure 11A:
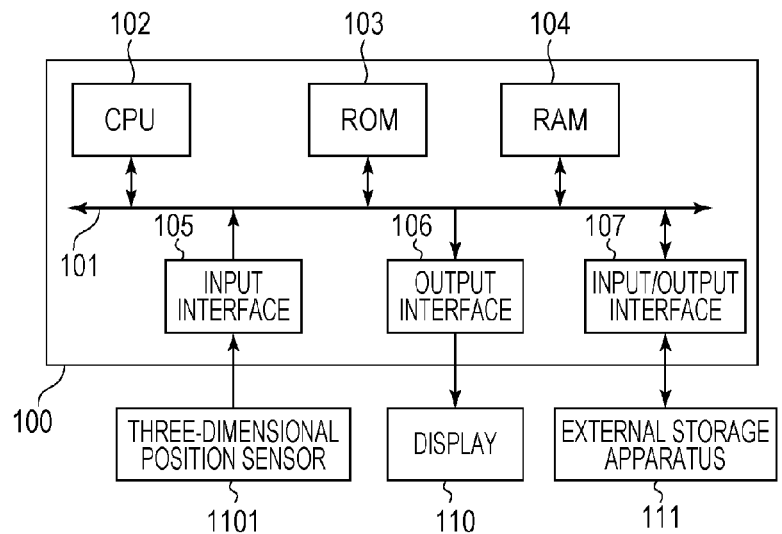
FIG. 11A is a block diagram illustrating an example of a hardware configuration of the information processing apparatus.

FIG. 11A is a diagram illustrating an example of a hardware configuration of the information processing apparatus 100 according to the present embodiment. Note that components that are the same as in FIG. 1A are denoted by the same reference numerals, and description thereof will be omitted.

A three-dimensional position sensor 1101 detects the position of the operating object in a three-dimensional space, and notifies the input interface 105. The three-dimensional position sensor 1101 uses a distance image sensor or stereo camera or the like.

Figure 11B:
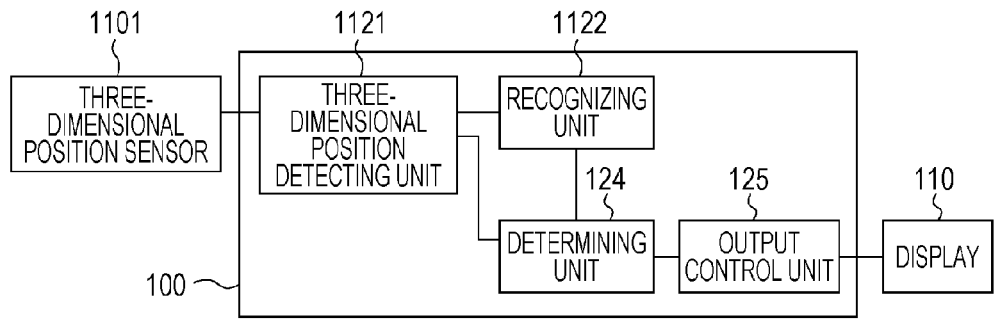
FIGS. 11B and 11C are block diagrams illustrating an example of a functional configuration of the information processing apparatus.

FIG. 11B is a block diagram illustrating an example of a functional configuration of the information processing apparatus 100 according to the present embodiment. Note that components that are the same as in FIG. 1B are denoted by the same reference numerals, and description thereof will be omitted.

A three-dimensional position detector 1121 detects the three-dimensional positions, at the time of the operation by the user and after the operation, based on a signal notified from the input interface 105. In this event, according to the present embodiment, the input interface 105 references the three-dimensional position information detected by the three-dimensional position sensor 1101 at certain intervals, and notifies a signal to the three-dimensional position detector 1121 sequentially, each time three-dimensional position information is acquired.

A recognizing unit 1122 according to the third embodiment recognizes a spatial operation by the user or an operation to touch an image projected on a screen or desk or the like, based on the three-dimensional position detected by the three-dimensional position detector 1121. Upon an operation being recognized by the recognizing unit 1122, the determining unit 124 determines whether or not the operation will be continued, based on the three-dimensional position detected by the three-dimensional position detector 1121. The determining method is basically similar to that of the first and second embodiments, and determination is made by movement distance, movement speed, movement direction, and the like.

Figure 11C:
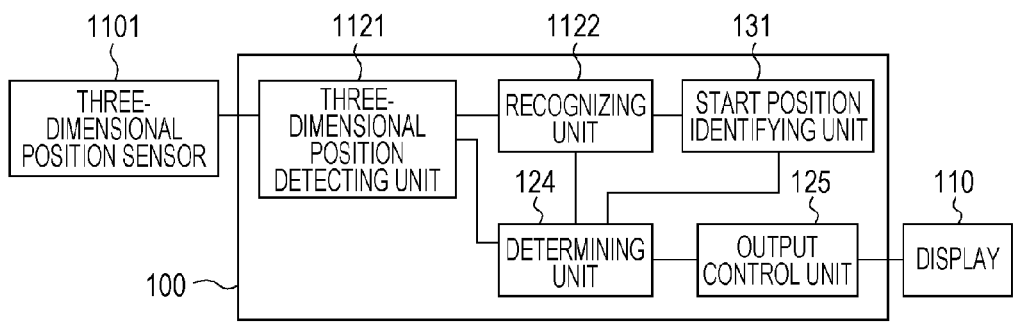

FIG. 11C is a block diagram illustrating an example of a functional configuration of the information processing apparatus 100 according to the present embodiment. In FIG. 11C, the touch sensor 108, proximity sensor 109, touch position detector 121, proximity position detector 122, and recognizing unit 123 in FIG. 1C are replaced with the three-dimensional position sensor 1101, three-dimensional position detector 1121, and recognizing unit 1122 in FIG. 11B. The components that are the same as in FIGS. 1C and 11B are denoted by the same reference numerals, and description thereof will be omitted.

Figure 12A:
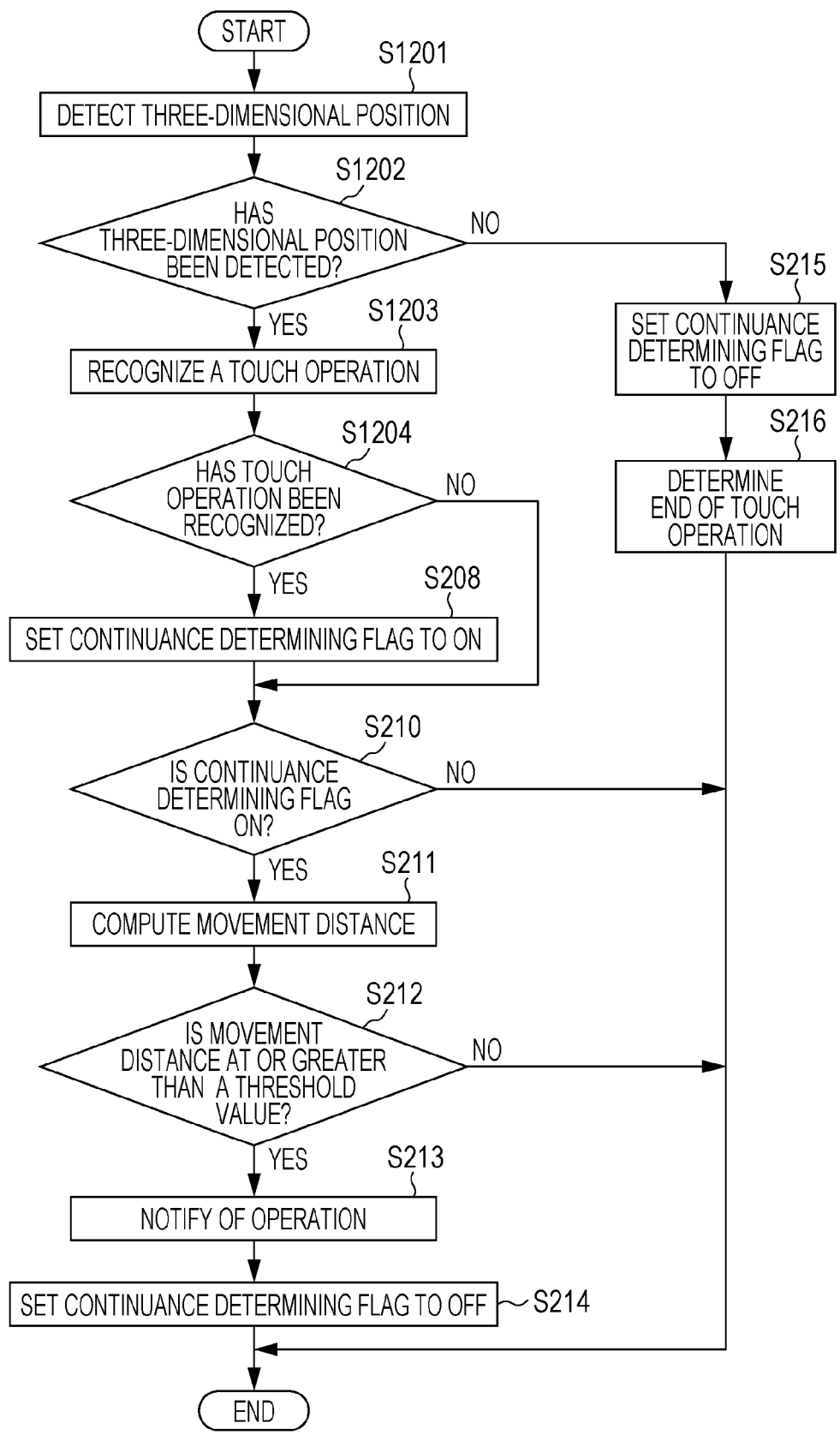

FIG. 12A is a flowchart describing an example of the flow of processing to recognize the operation. The processing that is the same as in FIG. 2 is denoted by the same reference numerals, and description thereof will be omitted.

In step S1201, the three-dimensional position detector 1121 detects the three-dimensional position notified from the three-dimensional position sensor 1101 to the input interface 105.

In step S1202, the recognizing unit 1122 determines whether or not a three-dimensional position has been detected in step S1201. In the case determination is made that a three-dimensional position has been detected (YES in step S1202), the processing is advanced to step S1203. On the other hand, in the case determination is made that a three-dimensional position has not been detected (NO in step S1202), the processing is advanced to step S215.

In step S1203, the recognizing unit 1122 recognizes the touch operation performed by the user, based on the information of the position that indicates a touch from the three-dimensional position information detected in step S1201. The operation recognized here, similar to the first and second embodiment, is recognized based on the touch operations registered in the information processing apparatus 100 beforehand as dictionary information.

In step S1204, determination is made as to whether or not a touch operation has been recognized in step S1203. In the case determination is made that an operation has been recognized (YES in step S1204), the processing is advanced to step S208. On the other hand, in the case determination is made that an operation has not been recognized (NO in step S1204), the processing is advanced to step S210.

In the case that a touch operation is recognized, the processing is advanced to step S208, and the continuance determining flag is set to "ON". Hereinafter, in the same way as with FIG. 2 in the case of the first embodiment, movement distance is acquired from the movement of the operating object in a state defined as a proximity state, based on the detected series of three-dimensional positions. Also, determination is made as to whether or not an operation will be continued, depending on whether or not the acquired movement distance exceeds a threshold.

Also, similar to the first embodiment, in the third embodiment also, the movement distance threshold may be set to a small value, and determination may be made as to whether or not the operation will be continued, depending on whether or not the movement distance from the previous three-dimensional position to the current three-dimensional position exceeds the threshold consecutively for a predetermined number of instances. Also, determination may be made as to whether or not the operation will be continued, depending on whether or not the movement direction from the previous three-dimensional position to the current three-dimensional position is continuously in the same direction for a predetermined number of times. Note that similar to the first embodiment, movement speed information may be used instead of movement distance.

FIG. 12B is a flowchart describing an example of the flow of processing to recognize an operation. FIG. 12B has the operating determining portion from the touch position and proximity position in FIG. 4 replaced by three-dimensional positions, similar to FIG. 12A, the same processing is denoted by the same reference numeral, and description thereof will be omitted. Also similar to FIG. 4, determination is made as to whether or not the operation will be continued, based on whether or not the movement direction acquired by the three-dimensional position after the operation is the direction of the starting position of the next operation.

As described above, according to the third embodiment, the touch operation performed by the user is recognized by detecting three-dimensional positions, and determination is made as to whether or not the next operation will be continued and input after the touch is released, based on the movement distance, movement speed, and movement direction acquired from the three-dimensional positions. Thus, regarding touch operations performed in a three-dimensional space, whether the operation is ended or is in process of being continued can be quickly distinguished, and feedback as to the operation can be output.

Note that in an apparatus that can detect three-dimensional positions, two states can be defined, an operating state and a state in which the operation is ended or suspended, whereby processing can be applied that quickly distinguishes whether the operation is ended or is being continued. For example, a system to recognize a gesture operation can be used in which, for a gesture operation that is performed by a user moving a hand, the three-dimensional positions of the hand can be tracked within a particular recognizing region (also called a gesture cutout region). In this case, whether the gesture operation is ended or will be continued can be distinguished based on the movement distance and movement direction of the hand at the point-in-time of exiting the recognizing region and thereafter. Thus, by the operating object using the three-dimensional position information from the point-in-time of leaving the operating state, a gesture operation, not limited to a touch operation, can be distinguished quickly to whether the operation is ended or is being continued.

Note that the present disclosure is not limited to input by touch operations to a touch panel, and can be applied to cases in which a first operation made up of a first input by a user and a second operation made up by the first input and a second input followed by the user can be recognized. In this case, in the event determination is made that an operating object such as a pen or finger that the user uses to input is not moving from movement content immediately following the first input being detected to a second input, regardless of whether there is a second input, a response corresponding to the first operation is quickly started. Input by the user may be an operation to press an operation button or may be a human movement to perform gesture input. Also, the response is equivalent to various types of processing that the apparatus executes corresponding to different operations, and for example may be rendering processing to display an image, an audio output, or the like.

According to the present disclosure, even in a case that an operation made up of a first input and a following input can be recognized, a response corresponding to the operation made up of only the first input can be quickly started.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-133530, filed Jun. 26, 2013, which is hereby incorporated by reference herein in its entirety.

What is claimed is:

1. An information processing apparatus operable to recognize a first operation made up of a first touch input and a second operation made up of a combination of the first input and a touch input that follows after the first input, the touch input that follows after the first touch input is input before a predetermined time period passes after the first touch, the information processing apparatus comprising:

a detecting unit configured to detect that, as one touch input, an operating object touches a touch target surface and then the operating object is released from the touch target surface; and a control unit configured to control output to start a response corresponding to the first operation without waiting for the predetermined time period to pass after the first touch input, in a case that at least a movement distance that the operating object has moved in a direction parallel to the touch target surface in a state of proximity to the touch target surface after the operating object is released from the touch target surface at the end of the first touch input exceeds a threshold, and configured to control output not to start the response corresponding to the first operation by the predetermined time period passes after the first touch input while the movement distance does not exceed the threshold.

2. The information processing apparatus according to claim 1,
wherein the control unit starts a response corresponding to a second operation in a case that the touch input that follows after the first touch input is detected by the detected unit before the predetermined time period passes after the first touch input and while the movement distance does not exceed the threshold.

3. The information processing apparatus according to claim 1,
wherein the detecting unit is a touch position detecting unit configured to detect touch positions of the operating object as to the touch target surface;
and wherein one touch input detected by the detecting unit is input based on a plurality of touch positions repeatedly detected by the touch position detecting unit from the time when the operating object touches a touch target surface to when the operating object is released from the touch target surface.

4. The information processing apparatus according to claim 3, further comprising:
a proximity position detecting unit configured to detect proximity positions of the operating object as to the touch target surface;
wherein the moving distance that the operating object has moved in a direction parallel to the touch target surface in a state of proximity to the touch target surface after the operating object is released from the touch target surface at the end of the first touch is acquired based on a proximity position detected by the proximity position detecting unit, after the touch positions corresponding to the first touch input are no longer detected by the touch position detecting unit.

5. The information processing apparatus according to claim 4, further comprising:
a determining unit configured to determine whether the movement distance that the operating object has moved in a direction parallel to the touch target surface in a state of proximity to the touch target surface after the operating object is released from the touch target surface at the end of the first touch input exceeds a threshold, and configured to control output not to start the response corresponding to the first operation by the predetermined time period passes after the first touch input while the movement distance does not exceed the threshold, based on the proximity positions detected by the proximity position detecting unit, after the touch positions making up the first touch input are no longer corresponding to the first touch input detected by the touch position detecting unit;

and wherein the control unit starts a response as to the first operation without waiting for the predetermined time period to pass after the first touch input in a case that determination is made by the determining unit that the movement exceeds the threshold.

6. The information processing apparatus according to claim 5,
wherein the determining unit acquires a movement distance each time the proximity positions are detected at a predetermined time interval by the proximity position detecting unit, after the touch positions corresponding to the first touch input are no longer detected by the touch position detecting unit,
wherein the determining unit further determines whether the acquired movement distance consecutively exceeds the threshold a predetermined number of times, and
wherein the control unit starts a response as to the first operation without waiting for the predetermined time period to pass after the first touch input in a case that determination is made by the determining unit that the movement distance exceeds the threshold and the acquired movement distance consecutively exceeds the threshold a predetermined number of times.

7. The information processing apparatus according to claim 1,
wherein the first operation is a single-tap operation and the second operation is a double-tap operation.

8. The information processing apparatus according to claim 3, further comprising:
a storage unit configured to store the second operation, correlated to a region within the touch target surface,
wherein the control unit output starts a response corresponding to the first operation without waiting for the predetermined time period to pass after the first touch input, in a case that a touch position corresponding to the first touch input detected by the touch position detecting unit is detected outside of the region.

9. The information processing apparatus according to claim 8, further comprising:
a correcting unit configured to correct, each time the second operation is recognized, the region corresponding to the operation, based on information of the touch position corresponding to the second operation which the touch position detecting unit has detected.

10. The information processing apparatus according to claim 1,
wherein the detecting unit detects three-dimensional positions of the operation object,
wherein touch input by the operating object is touch input based on the detected three-dimensional positions.

11. An information processing apparatus according to claim 1,
wherein the control unit determines whether or not to start a response corresponding to the first operation without waiting for the predetermined time period to pass after the first touch input, based on a last position of a series of positions detected in a state of proximity to the touch target surface after the operating object is released from the touch target surface at the end of the first touch, and based on a position indicating a position on the touch target surface that the first touch input has ended.

12. The information processing apparatus according to claim 1,
wherein the control unit is configured to control output to start the response corresponding to the first operation, in a case where the predetermined time period passes after the first touch input and before the movement distance doesn't exceed the threshold.

13. The information processing apparatus according to claim 1,
wherein the movement distance that the operating object has moved in a direction parallel to the touch target surface in a state of proximity to the touch target surface after the operating object is a component in the direction parallel to the touch target surface of the movement distance that the operating object has moved in a state of proximity to the touch target surface after the operating object.

14. An information processing apparatus operable to recognize a first operation made up of a first touch input and a second operation made up of the first touch input and a touch input that follows after the first touch input, the touch input that follows after the first touch input is input before a predetermined time period passes after the first touch input, the information processing apparatus comprising:
a detecting unit configured to detect that, as one touch input, an operating object touches a touch target surface and then the operating object is released from the touch target surface; and
a control unit configured to control output to start a response corresponding to the first operation without waiting for the predetermined time period to pass after the first touch input, in a case that a movement direction which is included in an aspect parallel to the touch target surface that the operating object has moved in a state of proximity to the touch target surface after the operating object is released from the touch target surface at the end of the first touch is a direction towards a position that the operating object will touch next in order to perform the touch input following after the first input, and configured to control output not to start the response corresponding to the first operation by the predetermined time period passes after the first touch input, in a case where the movement direction is not the direction towards the position that the operating object will touch next in order to perform the touch input following after the touch input.

15. The information processing apparatus according to claim 14, further comprising:
an identifying unit configured to identify the position where the operating object will touch next,
wherein the identifying unit identifies a starting position of the first touch input as the position where the operating object will touch next.

16. The information processing apparatus according to claim 15,
wherein the first operation and second operation are handwriting touch input operations as to the touch target surface, and
wherein the identifying unit identifies a starting position of a trail, which is stored as a next stroke of a trail made up of a series of touch positions corresponding to the first touch input, as the position that the operating object will touch next, based on information stored beforehand.

17. The information processing apparatus according to claim 15,
wherein the identifying unit identifies a starting position of the second touch input which is stored, correlated to the first touch input, as the position that the operating object will touch next, based on information stored beforehand.

18. The information processing apparatus according to claim 15,
wherein the identifying unit identifies a position displayed on a graphical user interface object of a display unit of the information processing apparatus, or a setting position of a physical object on the information processing apparatus, as the position that the operating object will touch next.

19. A control method of an information processing apparatus operable to recognize a first operation made up of a first touch input and a second operation made up of a combination of the first touch input and a touch input that follows after the first touch input, the touch input that follows after the first touch input is input before a predetermined time period passes after the first touch, the method comprising:
   detecting that, as one touch input, an operating object touches a touch target surface and then the operating object is released from the touch target surface; and
   controlling, so as to start a response corresponding to the first operation without waiting for the predetermined time period to pass after the first touch input, in a case that at least a movement distance that the operating object has moved in a direction parallel to the touch target surface in a state of proximity to the touch target surface after the operating object is released from the touch target surface at the end of the first touch input exceeds a threshold, and configured to control output not to start the response corresponding to the first operation by the predetermined time period passes after the first touch input while the movement distance does not exceed the threshold.

20. A non-transitory computer readable storage medium in which a program is stored for a computer to operate units of an information processing apparatus by causing the computer to read in and execute the program, the information processing apparatus operable to recognize a first operation made up of a first touch input and a second operation made up of a combination of the first touch input and a touch input that follows after the first touch input, the touch input that follows after the first touch input is input before a predetermined time period passes after the first touch, the information processing apparatus comprising:
   a detecting unit configured to detect that, as one touch input, an operating object touches a touch target surface and then the operating object is released from the touch target surface; and
   a control unit configured to control output to start a response corresponding to the first operation without waiting for the predetermined time period to pass after the first touch input, in a case that at least a movement distance that the operating object has moved in a direction parallel to the touch target surface in a state of proximity to the touch target surface after the operating object is released from the touch target surface at the end of the first touch input exceeds a threshold, and configured to control output not to start the response corresponding to the first operation by the predetermined time period passes after the first touch input while the movement distance does not exceed the threshold.

* * * * *